United States Patent
Naugariya

(10) Patent No.: US 10,033,823 B1
(45) Date of Patent: Jul. 24, 2018

(54) DATA PROXY

(71) Applicant: Amazon Technologies, Inc., Seattle, WA (US)

(72) Inventor: Ankit Naugariya, Patna (IN)

(73) Assignee: Amazon Technologies, Inc., Seattle, WA (US)

( * ) Notice: Subject to any disclaimer, the term of this patent is extended or adjusted under 35 U.S.C. 154(b) by 354 days.

(21) Appl. No.: 14/748,973

(22) Filed: Jun. 24, 2015

(51) Int. Cl.
*G06F 15/16* (2006.01)
*H04L 29/08* (2006.01)
*H04L 29/06* (2006.01)

(52) U.S. Cl.
CPC ...... *H04L 67/2804* (2013.01); *H04L 67/1095* (2013.01); *H04L 67/42* (2013.01)

(58) Field of Classification Search
CPC .. G06F 21/00; G06F 2221/2111; G06F 21/51; G06F 15/16; H04L 67/34; H04L 63/0281; H04L 63/102; H04L 63/062
See application file for complete search history.

(56) References Cited

U.S. PATENT DOCUMENTS

| | | | | |
|---|---|---|---|---|
| 8,695,030 B2* | 4/2014 | Runne | ................... | H04N 7/173 709/204 |
| 9,336,358 B2* | 5/2016 | Ramachandran | ....... | G06F 21/51 |
| 2010/0274922 A1* | 10/2010 | Reavely | ................. | H04L 67/14 709/238 |
| 2012/0005283 A1* | 1/2012 | Provo | ................... | G06Q 10/10 709/206 |
| 2013/0007725 A1* | 1/2013 | Brown | ...................... | G06F 8/61 717/173 |
| 2013/0191494 A1* | 7/2013 | Sidhu | ..................... | H04L 67/34 709/217 |

* cited by examiner

*Primary Examiner* — Benjamin M Thieu
(74) *Attorney, Agent, or Firm* — Davis Wright Tremaine LLP

(57) ABSTRACT

Users are provided with improved control over important business, personal, and other confidential data that is stored on computing devices by providing proxy data that may be provided in lieu of actual device data. In certain implementations, when an application installed on a computing device requests access to the data stored on the computing device, the user is presented with three options. The user can grant the request, deny the request, or fulfill the request using proxy data. In various implementations, proxy data has a format and structure compatible with the requested device data, but contains different values. Additional implementations are described that allow a user to use proxy data for part of a data set, or for portions of particular records within a data set.

20 Claims, 24 Drawing Sheets

US 10,033,823 B1

DATA PROXY

BACKGROUND

Computers and mobile devices have become an integral part of our daily lives. Email, instant messaging, social media, and cellular phones are used for a wide variety of business and personal communications. As a result, the computers and mobile devices that we use retain large amounts of personal information, business information, and confidential communications. Maintaining control over the distribution and use of this information is important to many users. Many users extend the functionality of their computers and mobile devices by downloading applications from the Internet, an app store, or other marketplace. Many of these applications request access to the information stored on the device as part of providing the desired functionality. For example, certain applications request access to contact data, text message data, instant messaging data, email messages, photos, or GPS location data. In some situations, when the user denies access to the requested data, the application shuts down or operates with reduced functionality.

BRIEF DESCRIPTION OF THE DRAWINGS

Various embodiments in accordance with the present disclosure will be described with reference to the drawings, in which.

DETAILED DESCRIPTION

Figure 1:
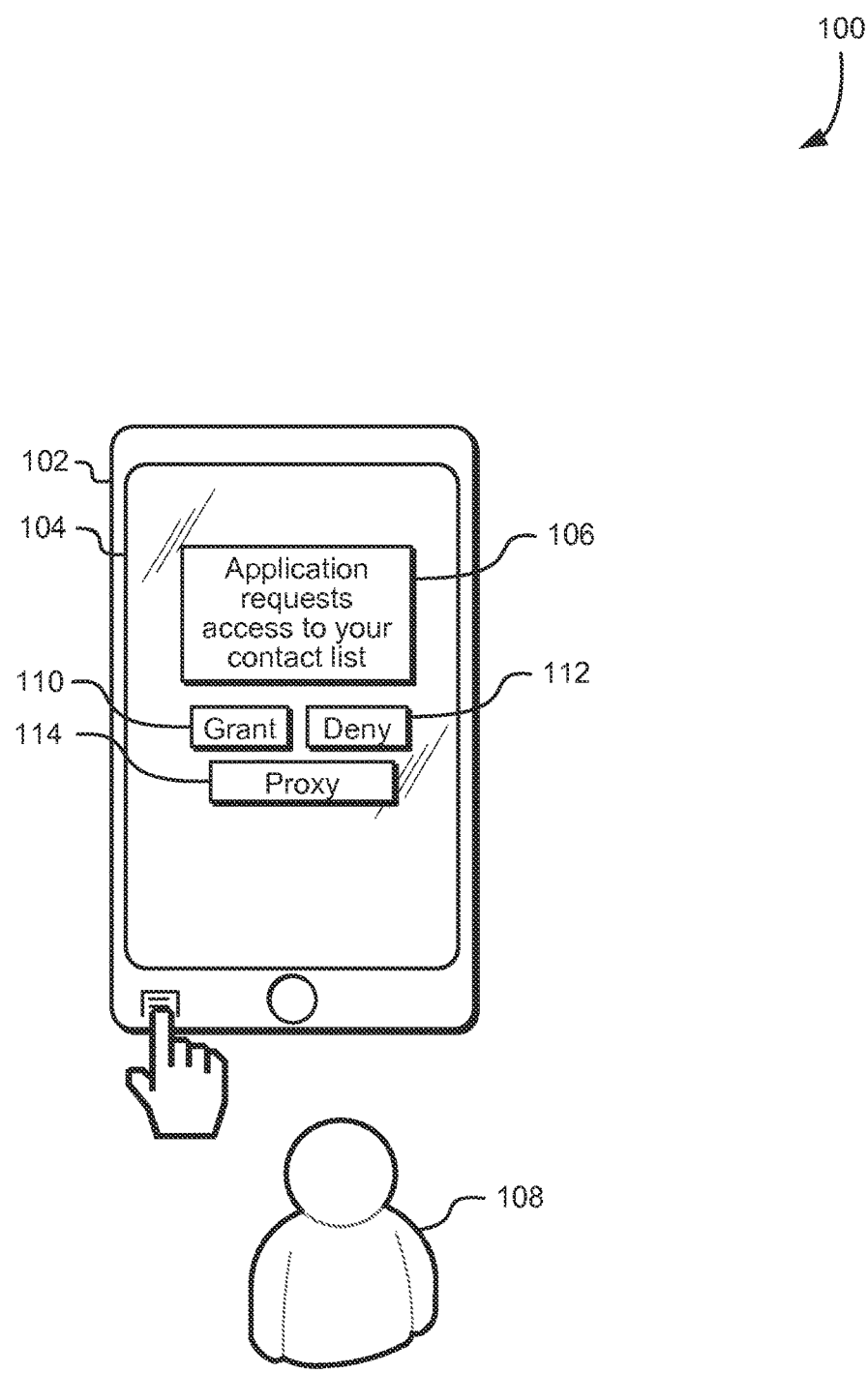
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The current document describes systems and methods that manage data stored on a computing device by providing a data proxy layer between an application and the data stored on the device. When the data proxy layer receives a request for data from the application, the data proxy layer decides whether to provide either device data or proxy data based on a user-specified data-proxy-layer configuration. Device data is non-executable application data stored on the device. Examples of device data include data stored on or maintained by the device such as contact data, instant messages, geolocation history, social networking data, email data, and other device data. Examples of proxy data include alternative data that conforms to a format and structure of corresponding device data, but has different values than the corresponding device data. The proxy data is compatible with the application, but includes at least some different values than the device data. For example, proxy contact records may include the same data fields for each proxy contact record as corresponding device contact records. Both proxy contact records and device contact records include first name, middle name, last name, home phone, home address, email address, title, instant messaging ("IM") address, cell phone, work phone, work address, and fax number data fields. At least some fields of the proxy contact information have different data values than the device data. In many situations, an application receiving a proxy contact record in response to a data request is unable to determine that the proxy contact record is not true device data. In such situations, the proxy contact records are an indistinguishable substitute for device contact records.

Proxy data may be generated having values based on corresponding device data. For example, device geolocation data can be modified to produce proxy geolocation data by delaying the availability of device geolocation data, or by adding an offset to the device geolocation data. Proxy data for device peripherals can be generated by reducing the accuracy, resolution, or fidelity of data from the device peripherals. In some situations, proxy data records are created by mixing proxy data values with device data values. For example, proxy contact records are created where selected fields of each contact record include device contact values, and the remaining fields of each contact record include proxy contact values. A set of proxy data may include a subset of device data. For example, a set of proxy email records are created from device email records by excluding device email records contained within selected folders. These and other techniques described in the present document allow the creation of proxy data that is adapted to the requirements of the requesting application, while addressing the privacy and security concerns of the device owner.

Proxy data may be generated using a reversible data transformation that allows device data values to be derived from proxy data values. In one example, proxy data values are generated by encrypting device data values with a cryptographic key known by a data proxy layer. In order to maintain proper data formatting, the encrypted device data values are encoded on the space of printable characters. The device data value can be recovered from the proxy data value by reversing the encoding and decrypting the encrypted value using the cryptographic key. In another example, proxy data is generated that includes embedded tags linking the proxy data to associated device data. When proxy data is received from the application, the corresponding device data is identified by matching the embedded tag from the proxy data to the corresponding device data using a lookup table.

Operation of a data proxy layer can be modified based at least in part on whether the requested data leaves the device. In one example, the data proxy layer determines whether the data requested by an application is transmitted to a remote server. This can be accomplished by monitoring network connections used by the application. As the application sends data over the network connections, the transmitted data is analyzed by the data proxy layer and device data contained within the transmitted data is detected. The data can be detected by noting a temporal correlation between the application's request for device data, and the transmission of data from the application to the remote server, or the data can be detected when the size of the data transmitted is compared to the size of the device data requested by the application, and when the data sizes are the same, the data proxy layer determines that the application is transmitting the device data. When the application uses the device data locally, and does not transmit the device data outside the device, the data proxy layer provides device data to the application. When the application transmits the device data outside the device, such as sending the device data to a remote server, the data proxy layer provides proxy data to the application. Whether the application transmits device data outside the device can be detected by monitoring the application's use of network services provided by the device. In some environments, the data proxy layer can be used to monitor transmission of data to and from the device.

The device data can include associated executable instructions or active elements that report to the data proxy layer when the device data is used. When the data is transmitted outside the device the active elements can report to the data proxy layer that the device data has been transmitted outside of the device.

FIG. 1 shows an illustrative example of an environment in which various embodiments may be practiced. Diagram 100 shows an illustration of a mobile computing device 102 having a display area 104. In various implementations, when an application running on the mobile computing device 102 attempts to access device data that is stored on the mobile computing device 102, a data proxy layer intercepts the request, and presents a request-proxy dialog box 106 on the display area 104. A user 108 is presented with buttons that represent three alternative responses. A grant button 110 allows the user to grant access to the device data. When the grant button 110 is selected, the data proxy layer provides the requested device data to the application. A deny button 112 allows the user to deny the application access to the device data. When the deny button 112 is selected, the data proxy layer does not provide the requested device data to the application, and does not provide proxy data to the application. A proxy button 114 allows the user to submit proxy data to the application as a substitute for the requested device data. When the proxy button 114 is selected, the data proxy layer generates application-compatible proxy data and provides the proxy data to the application. In some implementations, the data proxy layer records the user's selection for the application, and applies the selection to future requests for device data from the application.

Figure 2:
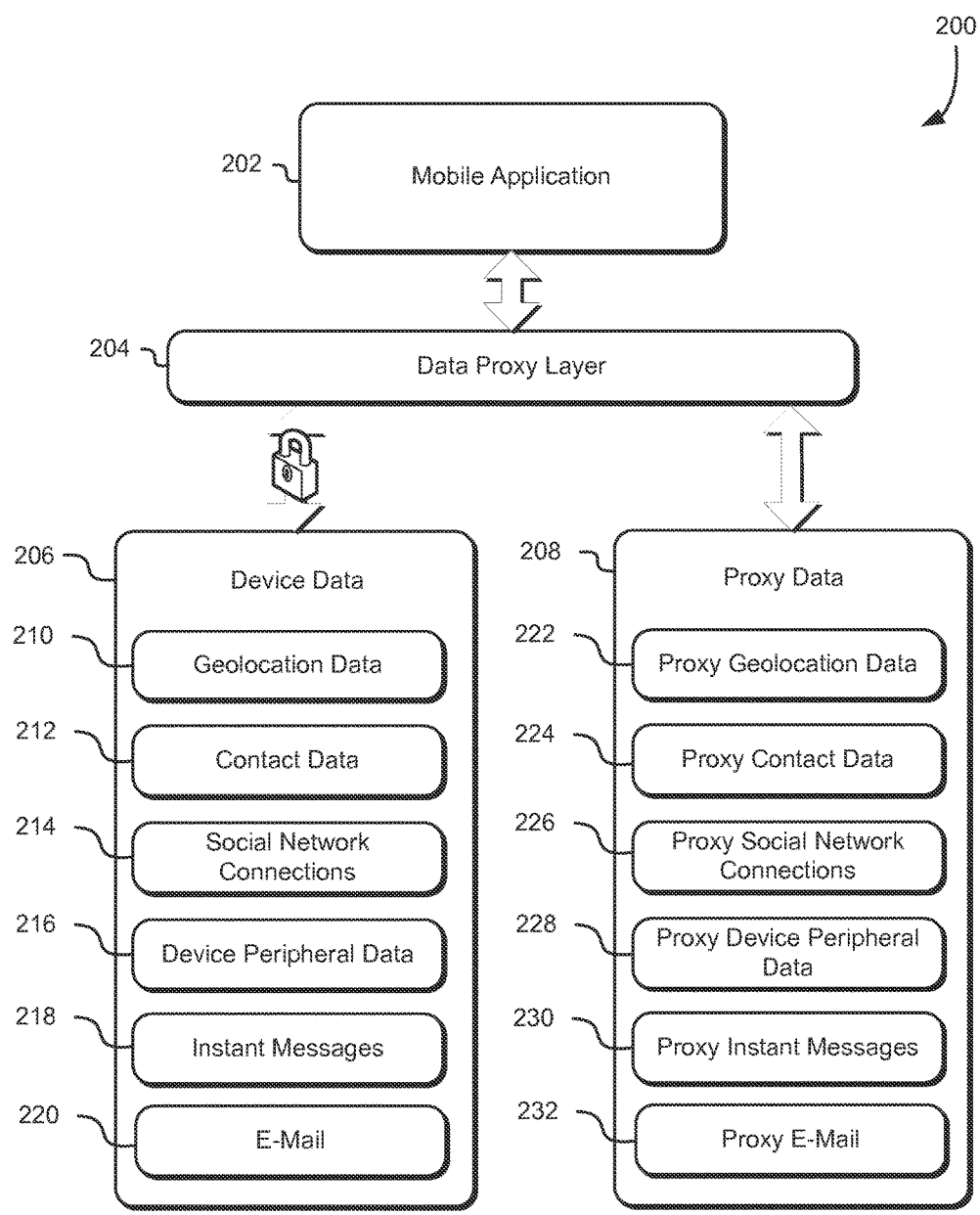
FIG. 2 shows an illustrative example of a mobile application using a data proxy layer to access device data and proxy data in accordance with an embodiment.

FIG. 2 shows an illustrative example of a mobile application using a data proxy layer to access device data and proxy data in accordance with an embodiment. A block diagram 200 illustrates a mobile application 202 communicating with a data proxy layer 204. The data proxy layer 204 has access to a set of device data 206 and a set of proxy data 208. The set of device data 206 includes geolocation data 210, contact data 212, social network connections 214, device peripheral data 216, instant messages 218, and email 220. The set of proxy data 208 includes proxy geolocation data 222, proxy contact data 224, proxy social network connections 226, proxy device peripheral data 228, proxy instant messages 230, and proxy email 232.

The data proxy layer 204 is, in many implementations, constructed as an application programming interface ("API") on the mobile device that has various interfaces that are used by applications for accessing device data. Various components of the data proxy layer 204 are implemented as executable modules or functional executable components within the API. In some implementations, proxy data is generated and/or stored within the data proxy layer 204. As used herein, the term layer refers to executable instructions that function as an interface between two parts of a computer system. For example, the data proxy layer 204 functions as an interface between requesting applications and device-data storage systems on the device. Application instructions being executed by a computing device contains instructions that direct the computing device to execute instructions in the data proxy layer 204. The instructions in the data proxy layer 204 directs the computing device to retrieve and process device data from the storage systems on the device, and then return the processed device data to the application.

In some embodiments, the data proxy layer 204 resides on a server off the mobile device, or on an intermediate platform between the mobile device and a server. For example, the data proxy layer 204 can be implemented as a web service, or be offered in combination with network infrastructure components such as a router, hub, or Wi-Fi router.

In various implementations, the data proxy layer 204 maintains a set of user-specified configuration parameters that specify particular conditions in which the data proxy layer 204 provides device data, proxy data, or a mixture of device data and proxy data. In some situations, the data proxy layer 204 responds to requests by the mobile application 202 for device data 206 by providing data from the set of proxy data 208. For example, in some implementations, when the mobile application 202 requests contact data 212, but a user enters configuration information that indicates to the data proxy layer 204 that contact data is not to be shared, the data proxy layer 204 retrieves proxy contact data 224 from the set of proxy data 208, and provides the proxy contact data 224 in lieu of the contact data 212. In another situation, when the configuration parameters specify that particular fields of the particular data set are not to be shared with the mobile application 202, the data proxy layer 204 responds to requests by the mobile application 202 for device data 206 by providing a mixture of data selected from the set of proxy data 208 and data selected from the set of device data 206. For example, in some situations, when the mobile application 202 requests contact data 212, the data proxy layer 204 provides a processed contact record where selected contact-record fields contain data extracted from the proxy contact data 224, and the remaining contact-record fields contain values extracted from the device contact data 212. In yet another situation, when the configuration parameters specify that a particular subset of device data is not to be shared with the mobile application 202, the data proxy layer 204 responds to requests by the mobile application 202 for device data by supplying a subset of device data selected from the set of device data 206.

Configuration parameters associated with the data proxy layer 204 can be entered in a variety of ways. In some implementations, the data proxy layer 204 is configured when the mobile application 202 requests access to the device data 206. For example, in one implementation, when a particular application makes a request to access the device data 206, the data proxy layer 204 presents a dialog to a user that allows the user to select whether the request for device data is granted, denied, or fulfilled using proxy data 208. In additional implementations, the data proxy layer 204 is configured when a particular application is installed on a device. For example, in some implementations, the user enters configuration information into a data-proxy configuration user interface that specifies, for the particular application, which requests for device data 206 will be granted, which requests for device data 206 will be denied, and which requests for device data 206 will be fulfilled using proxy data 208.

In yet additional implementations, the data proxy layer 204 is configured with default behaviors for various sets of device data, and when application-specific configuration parameters are not available, requests for device data 206 will be granted, denied, or proxied based at least in part on the particular device data being requested. In some implementations, a data-proxy configuration is established for each type of device data in the set of device data 206. For example, a particular data-proxy configuration grants requests for social network connection device data, but supplies proxy data when instant message data is requested. In another implementation, a data-proxy configuration is established for various subsets of each type of device data. For example, a data-proxy configuration can be defined that blocks access to email device data when the requested email is stored in specified folders, but grants access to other email device data.

The set of proxy data 208 is generated to conform to a format of the device data 206, but may contain different values. For example, device contact data 212 might include three contacts: Ted, John, and Alec. However, proxy contact data 224 might include four different contacts: Susie, Frank, Mary, and Robert. In some implementations, the user can specify the values used for proxy data. In other implementations, proxy data is generated using pseudorandom-data-generation techniques, and formatted to comply with the format of the device data 206. In some implementations, proxy data includes tags that link particular proxy data records to device data records. In another implementation, proxy data is generated by encrypting device data, and then encoding the encrypted device data so that the resulting value maps to a character set used by the corresponding device data.

In various implementations, the device data 206 can include other kinds of information. For example, device data 206 can include system-related information such as log files that describe device and mobile application history, or internal device state. Device data 206 can include application-related information such as web bookmarks, web history, and application execution history, or financial-related information such as payment information, and purchase information including in-app purchases. In some environments device data can include data associated with peripherals such as payment devices connected to the mobile device such as near field communication ("NFC") devices, tokens readers, payment readers and so on. For a cellular mobile device, the device data 206 can include cellular settings including cellular data settings that allow applications to control and retrieve data from a cell channel. Device data 206 may also include identity-related information such as account and profile information including accounts on the device, personal contact cards, and other identity information, and calendar-related information including calendar events and meetings. Cellular phone devices may have device information that includes phone call history, phone numbers, call history and missed call history. In some environments, device data 206 may include data related to network-connected peripherals, external storage devices, and data relating to devices in the proximity of the mobile device such as nearby Bluetooth devices, data from "wearable sensors" such as heart rate monitors, physical activity sensors, and data from environmental sensors such as gyroscope, temperature sensors, and vibration sensors.

In some implementations, the device data 206 is of a known format and structure. In such implementations, the proxy data 208 is created using the known format and structure so that the resulting proxy data is application-compatible. In another implementation, the device data 206 is of an unknown format and structure. When the format and structure of the device data 206 is not known, an application-compatible format and structure can be inferred by examining the existing device data 206. For example, a data field that includes only numerals can be inferred to have an integer format. In another example, a data field that includes a string of printable characters can be inferred to have a string format.

Figure 3:
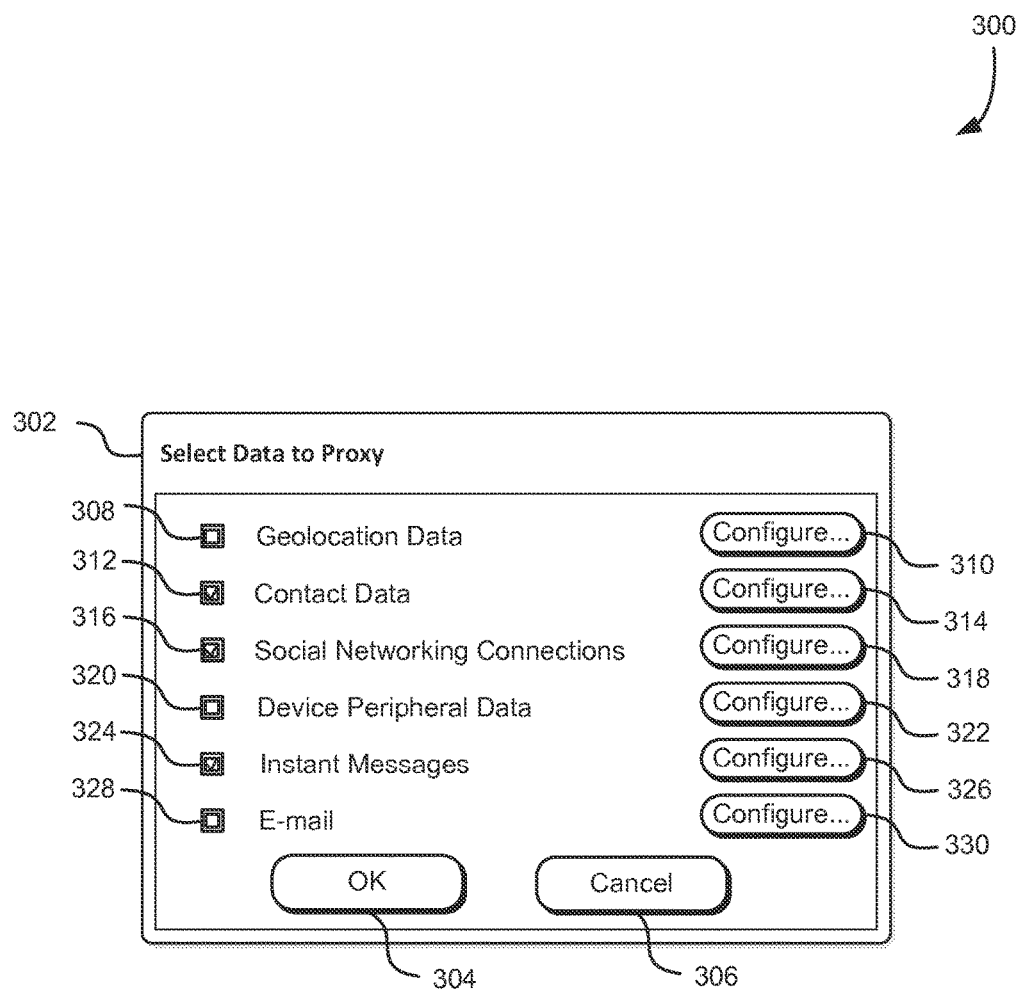
FIG. 3 shows an illustrative example of a user interface ("UI") for configuring a data proxy layer in accordance with an embodiment.

FIG. 3 shows an illustrative example of a user interface ("UI") for configuring a data proxy layer in accordance with an embodiment. A wireframe diagram 300 includes a proxy-configuration dialog box 302. The proxy-configuration dialog box 302 includes an okay button 304 that, when selected by a user, saves the configuration information indicated by the proxy-configuration dialog box 302 and closes the dialogue. A cancel button 306 can be selected by the user to abort the configuration information indicated by the proxy-configuration dialog box 302. The proxy-configuration dialog box 302 includes user interface elements that control aspects of the data proxy layer relating to six types of device data. By checking a geolocation checkbox 308, application requests for geolocation data will be fulfilled using a geolocation proxy. The geolocation proxy is configured by selecting a geolocation-proxy-configuration button 310. When the geolocation checkbox 308 is unchecked, application requests for geolocation data will be fulfilled using device geolocation data. The proxy-configuration dialog box 302 also includes a contact-data checkbox 312 with a contact-proxy-configuration button 314, a social-networking-connections checkbox 316 with a social-networking-proxy-configuration button 318, a device-peripheral checkbox 320 with a device-peripheral-proxy-configuration button 322, an instant-message checkbox 324 with an instant-message-proxy-configuration button 326, and an email checkbox 328 with an email-proxy-configuration button 330. When a particular checkbox is checked, requests for the associated type of device data are fulfilled using proxy data, and when the particular checkbox is unchecked, requests for the associated type of device data are fulfilled using device data.

In various implementations, different types of device data may be represented in the proxy-configuration dialog box 302. In some examples, the proxy-configuration dialog box 302 includes additional types of device data such as browser history, playlists, bookmarks, and task lists. In another example, the proxy-configuration dialog box 302 includes fewer types of device data. In yet another example, the proxy-configuration dialog box 302 includes a selection of device-data types based at least in part on the types of device data stored on the device.

Figure 4:
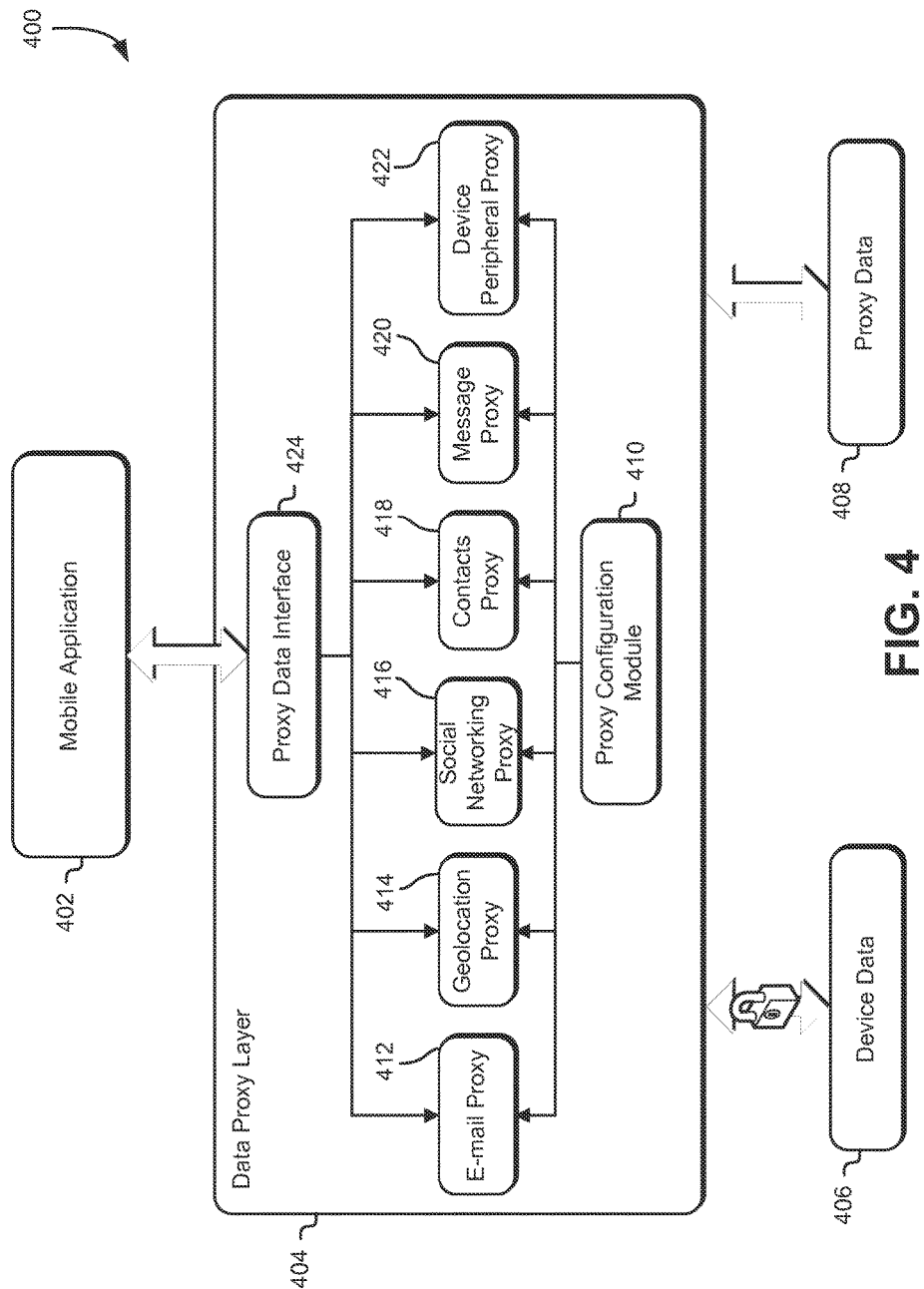
FIG. 4 shows an illustrative example of a data proxy layer in accordance with an embodiment.

FIG. 4 shows an illustrative example of a data proxy layer in accordance with an embodiment. A block diagram 400 shows a mobile application 402 in communication with a data proxy layer 404. The data proxy layer 404 has access to a set of device data 406 and a set of proxy data 408 for fulfilling requests by the mobile application 402. The data proxy layer 404 includes a proxy configuration module 410.

The proxy configuration module 410 is an executable module that obtains and stores configuration information associated with the data proxy layer 404. For example, in one embodiment, the proxy configuration module 410 displays the dialogue illustrated in FIG. 3, and retains the configuration information that was entered by the user. Additionally, the proxy configuration module 410 retains information relating to whether a particular application has been granted access to device data, denied access to device data, or supplied with proxy data. In some implementations, the proxy configuration module 410 synchronizes configuration information with an online service. Additional devices operated by the user synchronize their configuration information with the online service so that configuration information is shared across a number of devices owned by a single user.

In the particular implementation shown in FIG. 4, data proxy layer 404 includes a number of executable modules 412, 414, 416, 418, 420, and 422, each of which processes requests for a particular type of device data. An email proxy module 412 processes requests for email messages. A geolocation proxy module 414 processes requests for geolocation data. A social networking proxy module 416 processes requests for social networking contacts and data. A contacts proxy module 418 processes requests for contact data. A message proxy module 420 processes requests for instant messages, and a device-peripheral proxy module 422 processes requests for device peripheral data. Each proxy module can return device data, proxy data, or mixed proxy and device data, based at least in part on configuration information specific to each proxy module that is stored within the proxy configuration module 410. The various proxy modules receive and respond to requests for device data through a proxy data interface 424. The proxy data interface 424 implements an application programming interface ("API") that is used by applications such as the mobile application 402 when requesting device data.

Additional detail showing how the executable modules 412, 414, 416, 418, 420, and 422 may be implemented is shown in FIG. 6-FIG. 23 and is described in the associated description. For each proxy module, the current document provides an example of a user interface for configuring the proxy module, an example block diagram for the proxy module, and an example flowchart that illustrates the operation of the proxy module.

Figure 5:
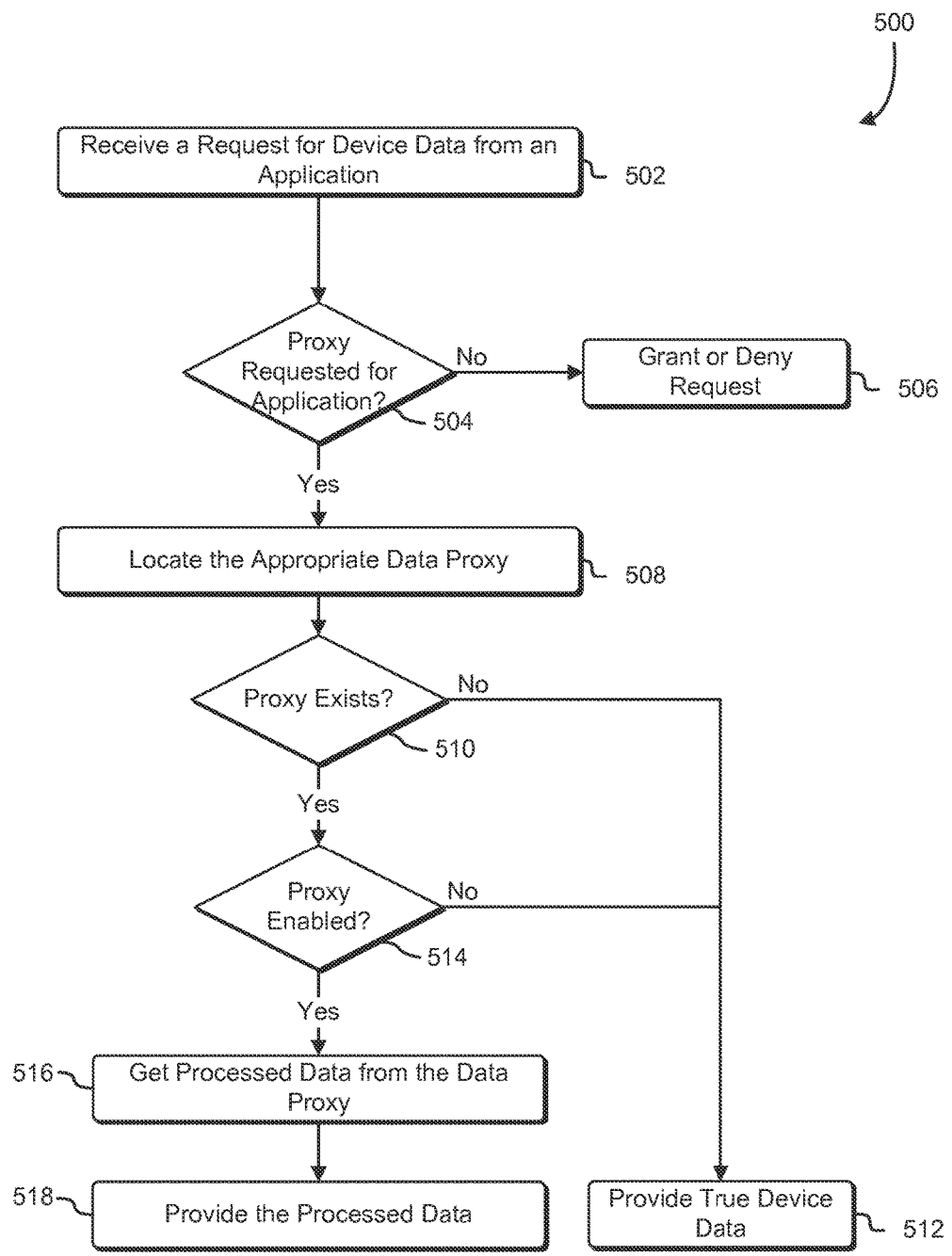
FIG. 5 shows an illustrative example of a process that, when performed by a data proxy layer, processes a request for data from an application in accordance with an embodiment.

FIG. 5 shows an illustrative example of a process that, when performed by a data proxy layer, processes a request for data from an application in accordance with an embodiment. A process diagram 500 illustrates a process performed by the data proxy layer. The process begins at block 502 where the data proxy layer receives a request for device data from an application. In various embodiments, the application can be a mobile application, a desktop application, or even a remote application that is requesting data from a local device.

The data proxy layer identifies the application making the request, and determines 504 whether the user has requested that proxy data be supplied to the identified application. In some implementations, the user is presented with a dialog box that offers options to grant the request, deny the request, or fulfill the request with proxy data. In another implementation, the data proxy layer queries information stored in a proxy configuration module to determine whether the user has requested that proxy data be supplied to the identified application. For example, in certain situations, the data proxy layer queries the proxy configuration module to determine whether the user previously specified that proxy data be used to fulfill requests from the identified application. In yet another implementation, the data proxy layer uses information in the proxy configuration module to determine whether the user has requested that proxy data be used for requests for the requested type of device data. For example, in some implementations, a user can specify that all requests for instant messages will be satisfied using proxy data.

When the data proxy layer determines 504 that the user has not requested a proxy for the identified application, execution proceeds to block 506. At block 506, the data proxy layer grants or denies the request for device data based at least in part on indications by the user. For example, when the user selects a grant option or a deny option rather than a proxy option when presented with the user interface as shown in FIG. 1, the data proxy layer grants or denies the application's request for device data based at least in part on the user's selection.

When the data proxy layer determines 504 that the user has requested that proxy data be used for the identified application, execution proceeds to block 508. At block 508, the data proxy layer determines the type of device data requested by the application, and locates an appropriate data proxy module within the data proxy layer to process the request. When the data proxy layer determines 510 that there is not a data proxy module for the type of device data requested by the application, the data proxy layer provides 512 device data in response to the request. When the data proxy layer determines 510 that there is a particular data proxy module for the type of device data requested by the application, the data proxy layer queries the proxy configuration module to determine 514 if the particular data proxy module is enabled. When the particular data proxy module is not enabled, execution proceeds to block 512 and device data is provided to the application in response to the request. When the particular data proxy module is enabled, the request is passed to the particular data proxy module.

At block 516, the particular data proxy module processes the request and produces processed proxy data. In various implementations, and depending on the configuration of the particular data proxy module, the processed data can be device data, modified device data, proxy data, or a mixture of device data and proxy data. The processed proxy data is provided 518 to the application by way of the proxy data interface 424.

Figure 6:
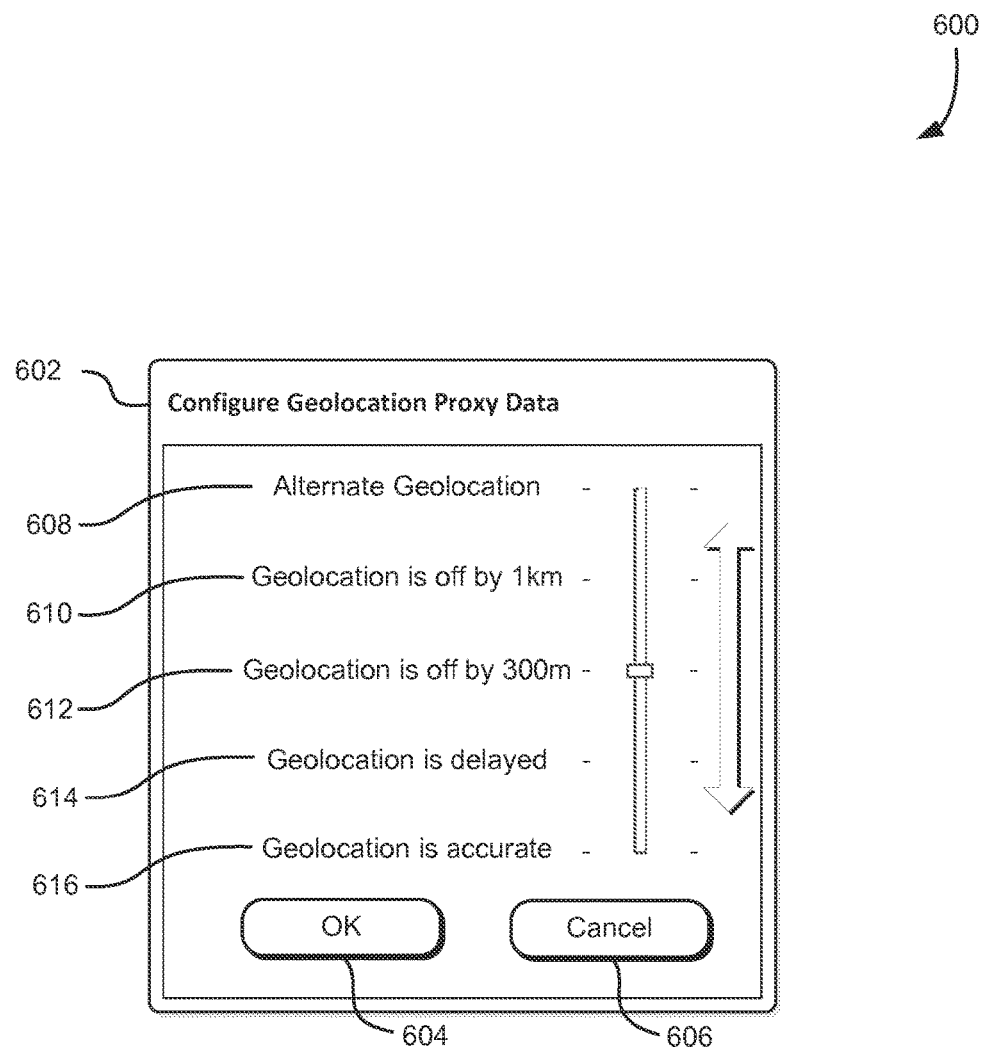
FIG. 6 shows an illustrative example of a UI for configuring a geolocation proxy module in accordance with an embodiment.

FIG. 6 shows an illustrative example of a UI for configuring a geolocation proxy module in accordance with an embodiment. A wireframe diagram 600 shows an example of a geolocation-configuration dialog box 602. The geolocation-configuration dialog box 602 includes an okay button 604 that, when selected by a user, saves the indicated geolocation-proxy-configuration information and closes the dialog box. A cancel button 606 closes the dialog box without saving the indicated geolocation-proxy-configuration information.

The geolocation-configuration dialog box 602 includes a vertical slider that is positionable to one of five positions corresponding to five geolocation-proxy-data generation schemes. When the user positions the vertical slider at an alternate geolocation position 608, a geolocation proxy module is configured to generate geolocation proxy data by providing an alternate geolocation. In some implementations, the alternate geolocation is a geolocation specified by the user in the proxy configuration module. In another implementation, the alternate geolocation is a geolocation determined based at least in part on a pseudorandom number. When the user positions the vertical slider at a 1 km offset position 610, the geolocation proxy module is configured to generate geolocation proxy data that represents a position that is 1 km from a position indicated by the device geolocation data. In some embodiments, the geolocation proxy module generates geolocation proxy data with an average error of 1 km. In additional embodiments, the geolocation proxy module generates geolocation proxy data having a minimum error of 1 km. When the user positions the vertical slider at a 300 m offset position 612, the geolocation proxy module is configured to generate geolocation proxy data that represents a position that is 300 m from a position indicated by the device geolocation data. When the user positions the vertical slider at a delayed geolocation position 614, the geolocation proxy module is configured to generate geolocation proxy data that is delayed by a specified amount of time. In some implementations, the geolocation proxy module is configured by the user to delay the geolocation proxy data by a configurable amount of time. When the user positions the vertical slider at an accurate geolocation position 616, the geolocation proxy module is configured to generate geolocation proxy data that is substantially equal to the device geolocation data. In some implementations, when the user positions the vertical slider at the accurate geolocation position 616, the geolocation proxy module is disabled.

Figure 7:
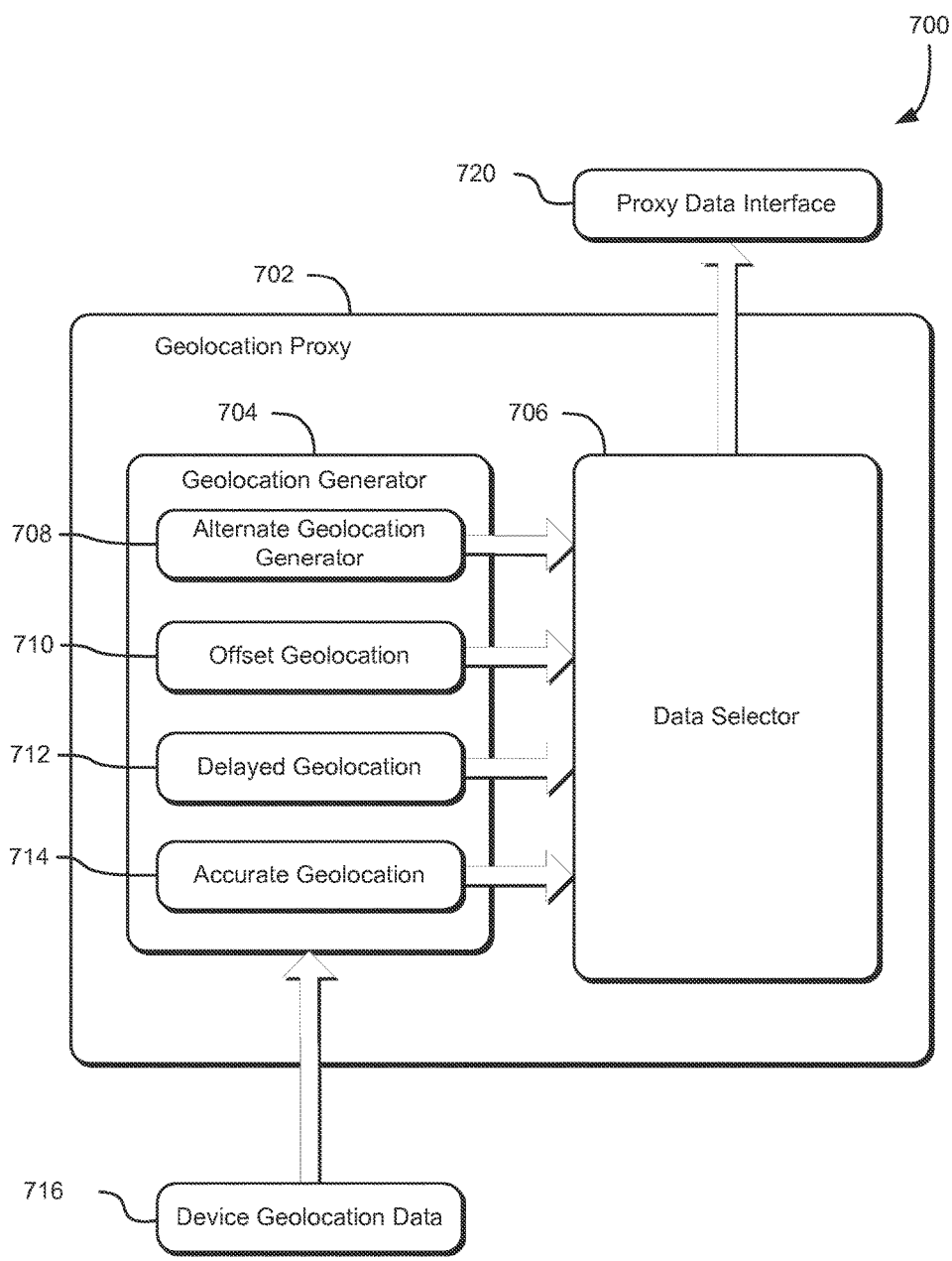
FIG. 7 shows an illustrative example of a geolocation proxy module in accordance with an embodiment.

FIG. 7 shows an illustrative example of a geolocation proxy module in accordance with an embodiment. A block diagram 700 illustrates an example of a geolocation proxy module 702. The geolocation proxy module 702 includes a geolocation generator 704 and a data selector 706.

The geolocation generator 704 is an executable module that generates geolocation proxy data using four alternative geolocation-data-generation modules. An alternate geolocation generator 708 generates geolocation proxy data by providing geolocation data that is specified by the user, or in some embodiments, by using geolocation data that is generated based at least in part on a pseudorandom value. An offset geolocation generator 710 generates geolocation proxy data based at least in part on device geolocation data and an offset direction and distance measured in feet, meters, or other unit of distance measurement. The offset geolocation generator 710 modifies the geolocation indicated by the device geolocation data by adding a user-configurable offset distance and direction to the device geolocation data. In some implementations, the user-configurable offset is 1 km. In another implementation, the user-configurable offset is 300 m. In yet another implementation, the user-configurable offset is a parameter passed to the offset geolocation generator 710. An offset direction can be generated by reversing the device's direction of travel, or by generating a pseudorandom direction parallel to the surface of the earth. A delayed geolocation generator 712 generates geolocation proxy data by delaying the device geolocation data. For example, in one implementation, the delayed geolocation generator 712 periodically stores device geolocation data in memory, and indexes the stored device geolocation data with a timestamp. When a delayed geolocation is requested, the delayed geolocation generator 712 subtracts an amount of time that geolocation proxy data is delayed from the current time, and retrieves a stored device geolocation based at least in part on the calculated time. An accurate geolocation generator 714 generates geolocation proxy data by supplying a device geolocation data 716. The data selector 706 selects a geolocation value from one of the geolocation generators based at least in part on configuration information associated with the geolocation proxy module 702. The data selector 706 provides the selected geolocation value to a proxy data interface 720 that, in turn, provides the geolocation proxy data to a requesting application.

Figure 8:
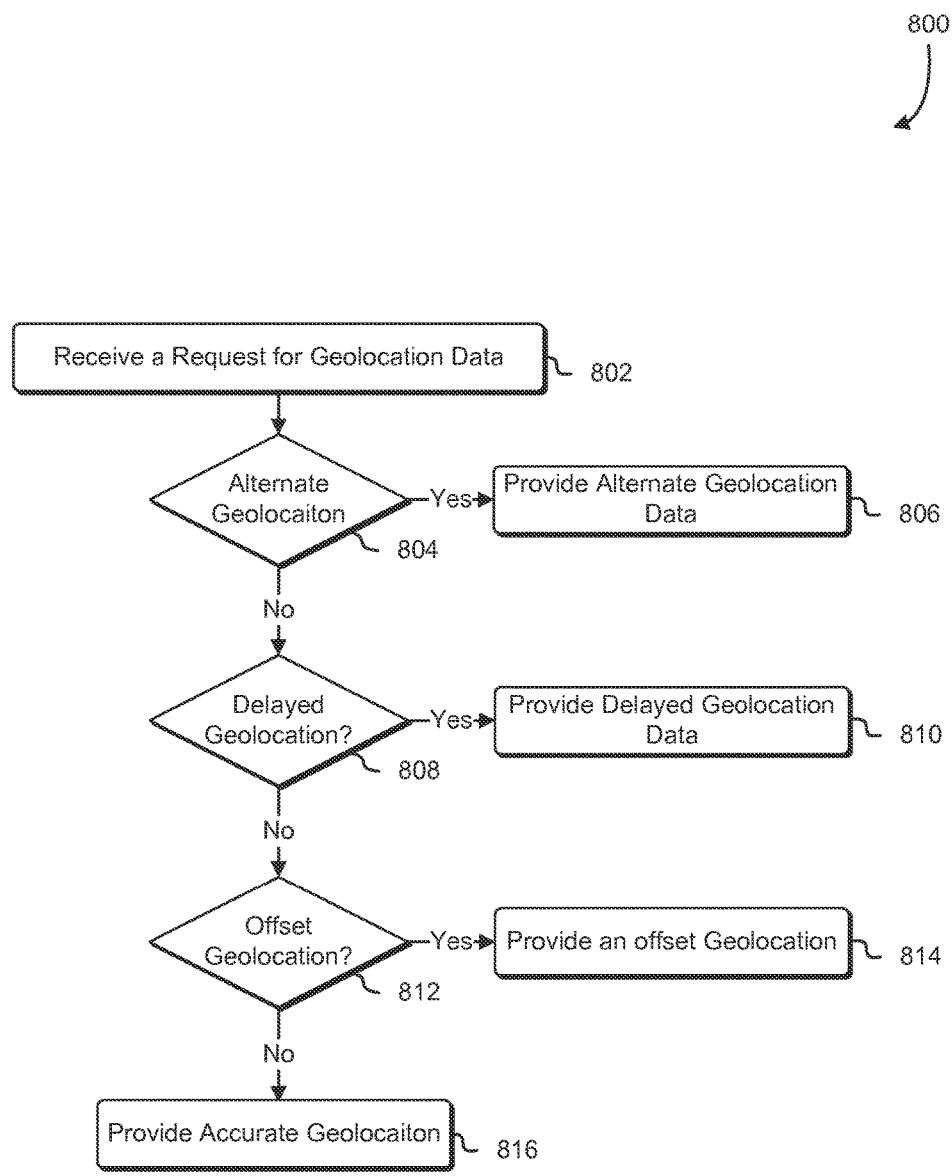
FIG. 8 shows an illustrative example of a process that, when performed by a geolocation proxy module, processes a request for geolocation data in accordance with an embodiment.

FIG. 8 shows an illustrative example of a process that, when performed by a geolocation proxy module, processes a request for geolocation data in accordance with an embodiment. A process diagram 800 illustrates a process performed by a geolocation proxy module. The process begins at block 802 where the geolocation proxy module receives a request for geolocation data from a proxy data interface. The geolocation proxy module determines 804 whether an alternate geolocation has been selected as the method for generating proxy geolocation data. When an alternate geolocation has been selected as the method for generating proxy geolocation data, execution proceeds to block 806 and the proxy geolocation module generates and provides an alternate geolocation to the proxy data interface. When an alternate geolocation is not the selected method of generating proxy geolocation data, the geolocation proxy module determines

808 whether a delayed geolocation is the selected method for generating proxy geolocation data. When a delayed geolocation is the selected method for generating proxy geolocation data, execution proceeds to block 810 and the geolocation proxy module generates and provides a delayed geolocation to the proxy data interface. When a delayed geolocation is not the selected method, the geolocation proxy module determines whether an offset geolocation is the selected method for generating proxy geolocation data. When an offset geolocation is the selected method for generating proxy geolocation data, execution proceeds to block 814 where the geolocation proxy module generates and provides an offset geolocation to the proxy data interface. When an offset geolocation is not the selected method for generating proxy geolocation data, execution proceeds to block 816, and the proxy data module provides a true device geolocation to the proxy data interface.

Figure 9:
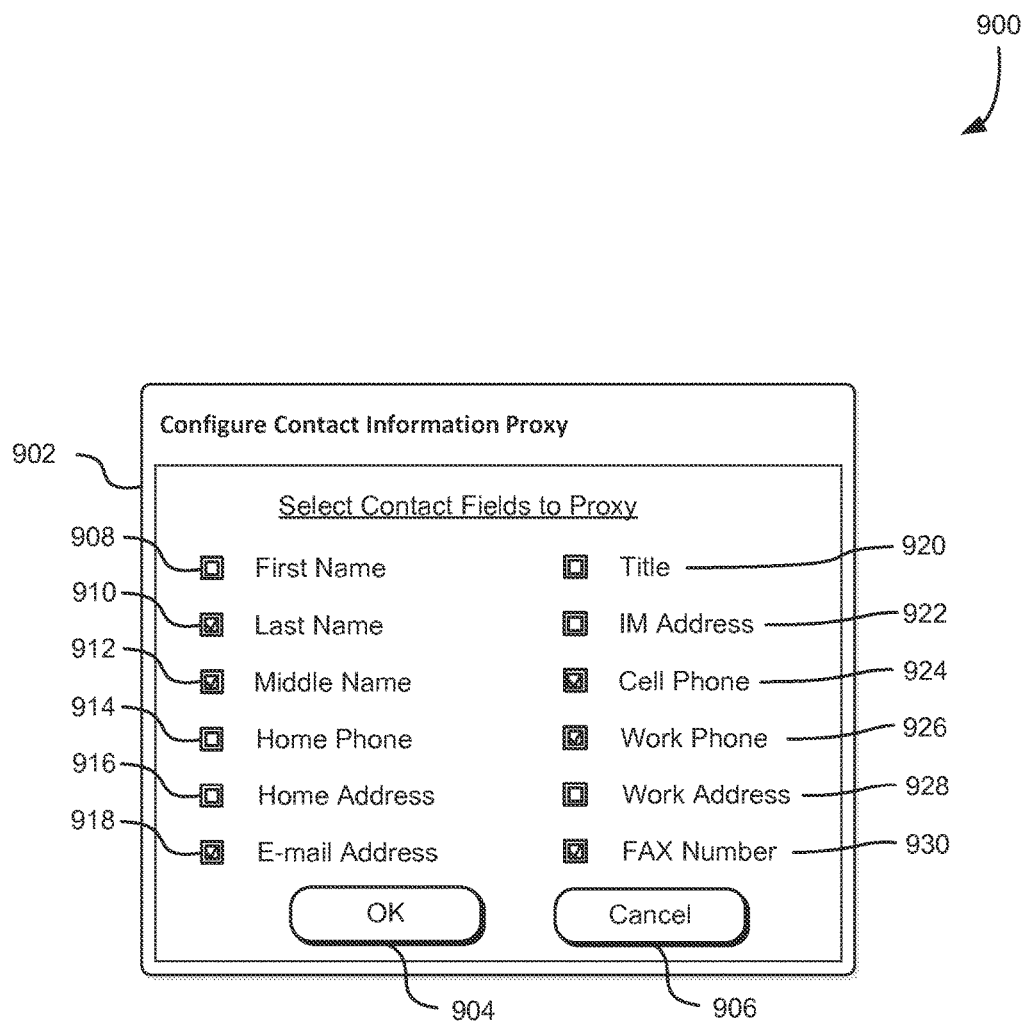
FIG. 9 shows an illustrative example of a UI for configuring a contact-data proxy module in accordance with an embodiment.

FIG. 9 shows an illustrative example of a UI for configuring a contact-data proxy module in accordance with an embodiment. A wireframe diagram 900 shows an example of a contact-configuration dialog box 902. The contact-configuration dialog box 902 includes an okay button 904 that, when selected by a user, saves the indicated contact-configuration information and closes the dialog box. A cancel button 906 closes the dialog box without saving the indicated contact-configuration information.

In the particular example illustrated, the contact-configuration dialog box 902 includes 12 checkboxes. Each of the 12 checkboxes represents a data field contained within a contact record. By checking a particular set of checkboxes, the user can indicate which fields within a blended proxy contact record will contain proxy data, and which fields will contain device data. For example, by checking a first name checkbox 908, the user indicates that the first name data field of each contact record is to be replaced with proxy data. When the first name checkbox 908 is not checked, the first name data field of each contact record contains device data. The contact-configuration dialog box 902 includes a last name checkbox 910, a middle name checkbox 912, a home phone checkbox 914, a home address checkbox 916, an email address checkbox 918, a title checkbox 920, an instant message checkbox 922, a cell phone checkbox 924, a work phone checkbox 926, a work address checkbox 928, and a fax number checkbox 930. Each checkbox indicates whether proxy data is to be used for a corresponding field within each contact record.

Figure 10:
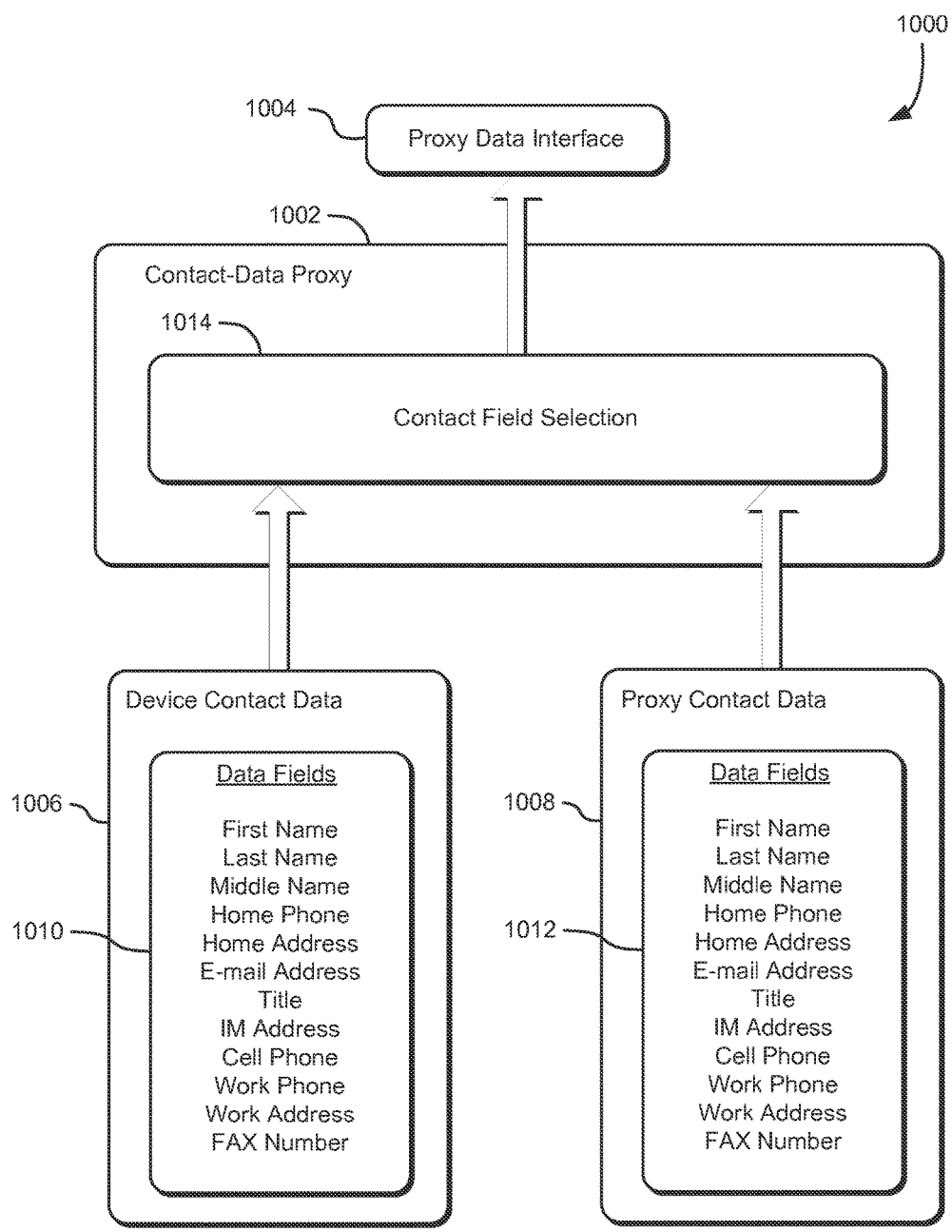
FIG. 10 shows an illustrative example of a contact-data proxy module in accordance with an embodiment.

FIG. 10 shows an illustrative example of a contact-data proxy module in accordance with an embodiment. A block diagram 1000 illustrates an example of a contact-data proxy module 1002. The contact-data proxy module 1002 provides blended contact data to a requesting application via a proxy data interface 1004. A set of device contact data 1006 and a set of proxy contact data 1008 are used by the contact-data proxy module 1002 to form contact records that are a blend of device and proxy contact data. The set of device contact data 1006 includes a number of device contact data fields 1010. The device contact data fields 1010 include a first name, a last name, a middle name, a home phone, a home address, an email address, a title, an IM address, a cell phone, a work phone, a work address, and a fax number. The set of proxy contact data 1008 includes a number of proxy contact data fields 1012. The proxy contact data fields 1012 include a first name, a last name, a middle name, a home phone, a home address, an email address, a title, an IM address, a cell phone, a work phone, a work address, and a fax number. In various embodiments, the device contact data fields 1010 and the proxy contact data fields 1012 may include additional or fewer data fields. In order to provide complete proxy contact records, the set of proxy contact data fields 1012 should include at least the same data fields as the device contact data fields 1010.

The contact-data proxy module 1002 includes a contact field selection module 1014. The contact field selection module 1014 selects data fields from the device contact data 1006 and the proxy contact data 1008 based at least in part on configuration information associated with contact-data proxy module 1002. In some implementations, an interface such as that shown in FIG. 9 is used to collect the configuration information. The contact-data proxy module 1002 merges portions of records from the device contact data 1006 and the proxy contact data 1008 into combined proxy contact data records which are provided to the requesting application via the proxy data interface 1004.

Figure 11:
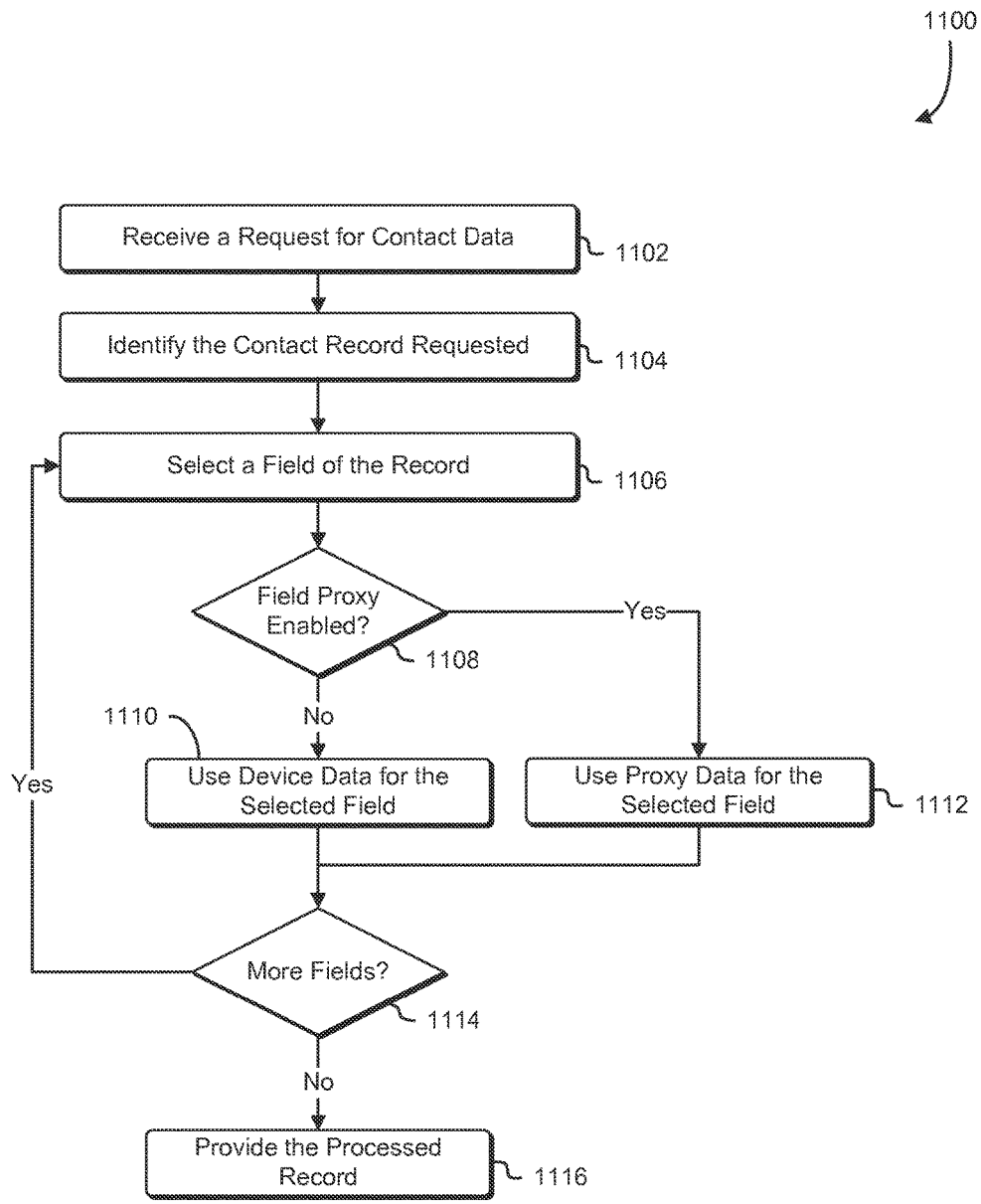
FIG. 11 shows an illustrative example of a process that, when performed by a contact-data proxy module, processes a request for contact data in accordance with an embodiment.
Figure 12:
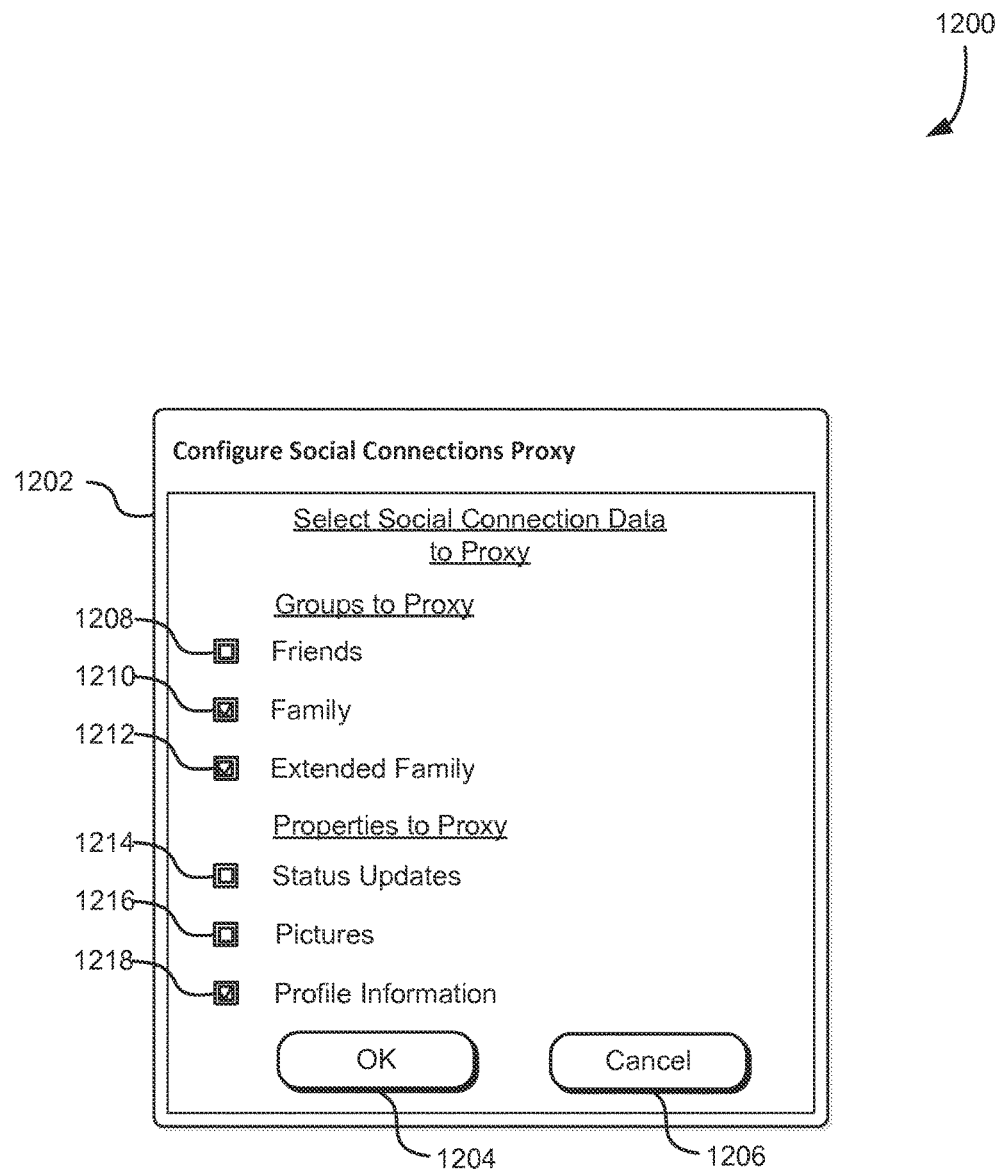
FIG. 12 shows an illustrative example of a UI for configuring a social-data proxy module in accordance with an embodiment.

FIG. 11 shows an illustrative example of a process that, when performed by a contact-data proxy module, processes a request for contact data in accordance with an embodiment. A process diagram 1100 illustrates a process performed by a contact-data proxy data module. The process begins at block 1102 where the contact-data proxy data module receives a request from an application for contact data via a proxy data interface. At block 1104, the contact-data proxy data module identifies a particular contact record that is requested. Next, the contact-data proxy data module selects 1106 a field of the particular contact record. Using configuration information associated with the contact-data proxy data module, the contact-data proxy data module determines 1108 whether device contact data or proxy contact data is to be used for the selected field. When proxy contact data is not enabled for the selected field, device contact data is used 1110 for the selected field. When proxy contact data is enabled for the selected field, proxy contact data is used 1112 for the selected field. When the contact-data proxy data module determines 1114 that there are additional fields of the particular contact record to be processed, execution returns to block 1106 where another field of the particular record is selected. Once all fields of the particular record are processed, execution proceeds to block 1116 where the completed record is provided to the application via the proxy data interface FIG. 12 shows an illustrative example of a UI for configuring a social-data proxy module in accordance with an embodiment. A wireframe diagram 1200 shows an example of a social-connections dialog box 1202. The social-connections dialog box 1202 includes an okay button 1204 that, when selected by a user, saves the indicated social-connections-proxy configuration information and closes dialog box. A cancel button 1206 closes the dialog box without saving the indicated social-connections-proxy configuration.

The social-connections dialog box 1202 includes two groups of checkboxes. A first group of checkboxes lists a number of social connection groups that, when selected, will be replaced with proxy data. For example, the first group of checkboxes includes a friends checkbox 1208, a family checkbox 1210, and an extended family checkbox 1212. When the friends checkbox 1208 is checked, a request from an application for a particular social connection that belongs to the friends social group will be fulfilled with proxy data. When the family checkbox 1210 is not checked, a request from an application for a particular social connection that belongs to the family social group will be fulfilled with device data.

A second group of checkboxes lists a number of connection properties that will be replaced with proxy data when selected. The second group of checkboxes includes a status updates checkbox 1214, a pictures checkbox 1216, and a profile information checkbox 1218. When an application requests a particular social connection that belongs to a group that is selected in the first group of checkboxes, the properties of the particular social connection selected in the second group of checkboxes will be fulfilled with proxy data, and the remaining properties of the particular social connection will be fulfilled with device data.

In this implementation, the combination of group and property selection enables a user to select a subset of social-connection data to proxy, and also to specify a subset of social-connection properties to proxy. In additional implementations, similar techniques can be applied to generating contact proxy data.

In some implementations, the social-connections dialog box 1202 displays a number of selectable connection groups. In one example, the number of selectable connection groups are displayed as a series of tabs. When a particular connection group is selected, a set of selectable connection properties is displayed. Selecting a particular connection property causes proxy data to be generated for the particular selected connection property for the particular connection group.

Figure 13:
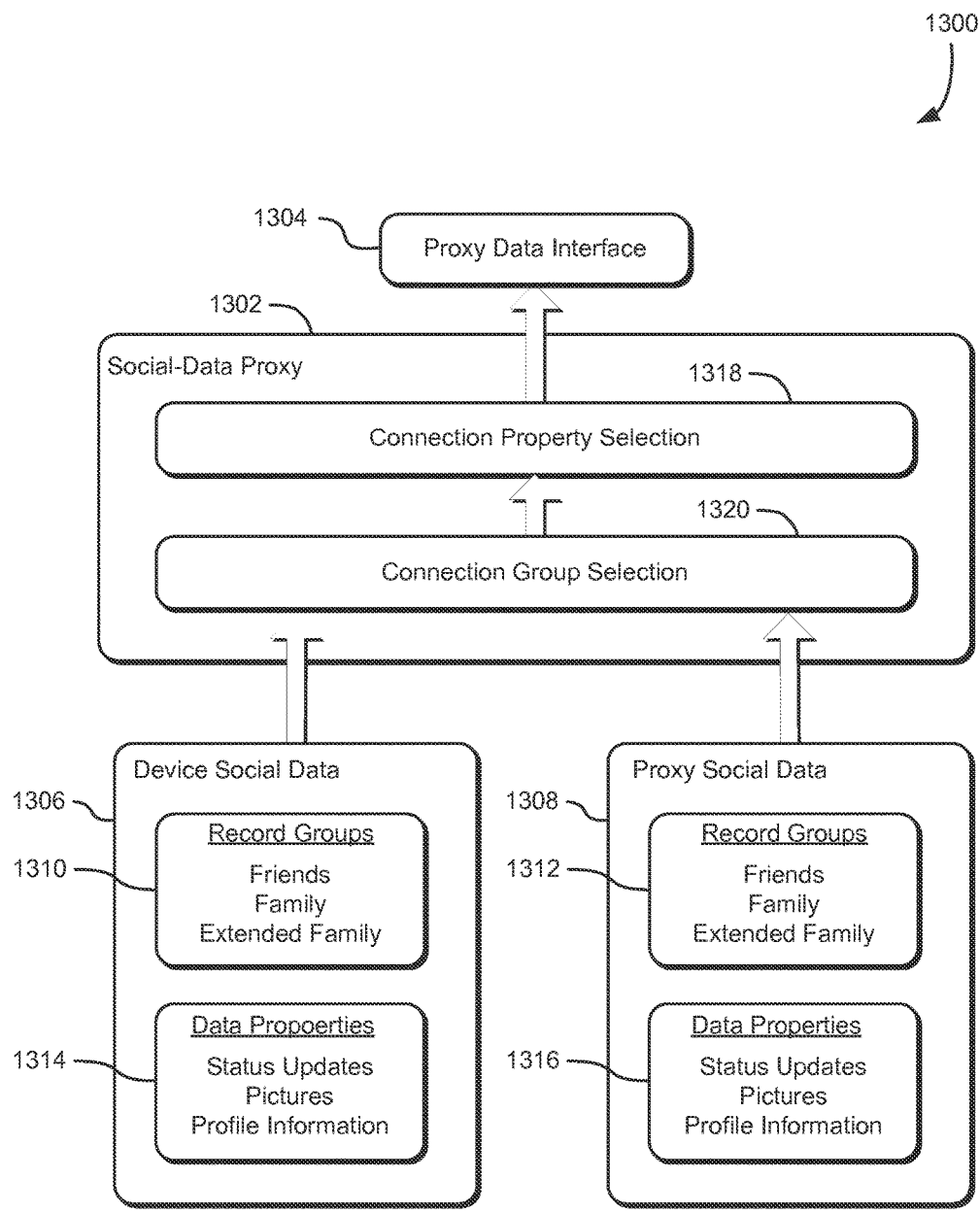
FIG. 13 shows an illustrative example of a social-data proxy module in accordance with an embodiment.

FIG. 13 shows an illustrative example of a social-data proxy module in accordance with an embodiment. A block diagram 1300 illustrates an example of a social-data proxy module 1302. The social-data proxy module 1302 provides social-connection data to requesting applications via a proxy data interface 1304. The proxy data interface 1304 provides a common interface to the various proxy modules contained in a data proxy layer. The social-data proxy module 1302 has access to a set of device social data 1306 and a set of proxy social data 1308. The set of device social data 1306 includes records that belong to a number of device record groups 1310. The set of proxy social data 1308 includes records that belong to a number of proxy record groups 1312. Records included in the device social data 1306 have a number of device data properties 1314. Records included in the proxy social data 1308 include a number of proxy data properties 1316. In the implementation shown, the device record groups 1310 and the proxy record groups 1312 include a friends group, a family group, and an extended family group. In some implementations, the proxy record groups 1312 include additional groups that are not present in the device record groups 1310. In the implementation shown, the device data properties 1314 and the proxy data properties 1316 include status updates, pictures, and profile information. In some implementations, additional social-data-record properties are included such as life events, likes, relationship information, and work history.

The social-data proxy module 1302 includes a connection property selection module 1318 and a connection group selection module 1320. When a request for social data is processed by the social-data proxy module 1302, the connection group selection module 1320 identifies the particular social data record requested, and identifies a connection group to which the particular social data record belongs. If the identified group has not been selected by the user as a connection group to proxy, the request is satisfied with the device social data 1306. If the identified group has been selected by the user as a connection group that will be proxied, then the connection property selection module 1318 determines which properties of the particular social data record will contain proxy social data and which properties of the particular social data record will contain device social data based at least in part on configuration information associated with the social-data proxy module. The combined record is returned to the application via the proxy data interface 1304.

Figure 14:
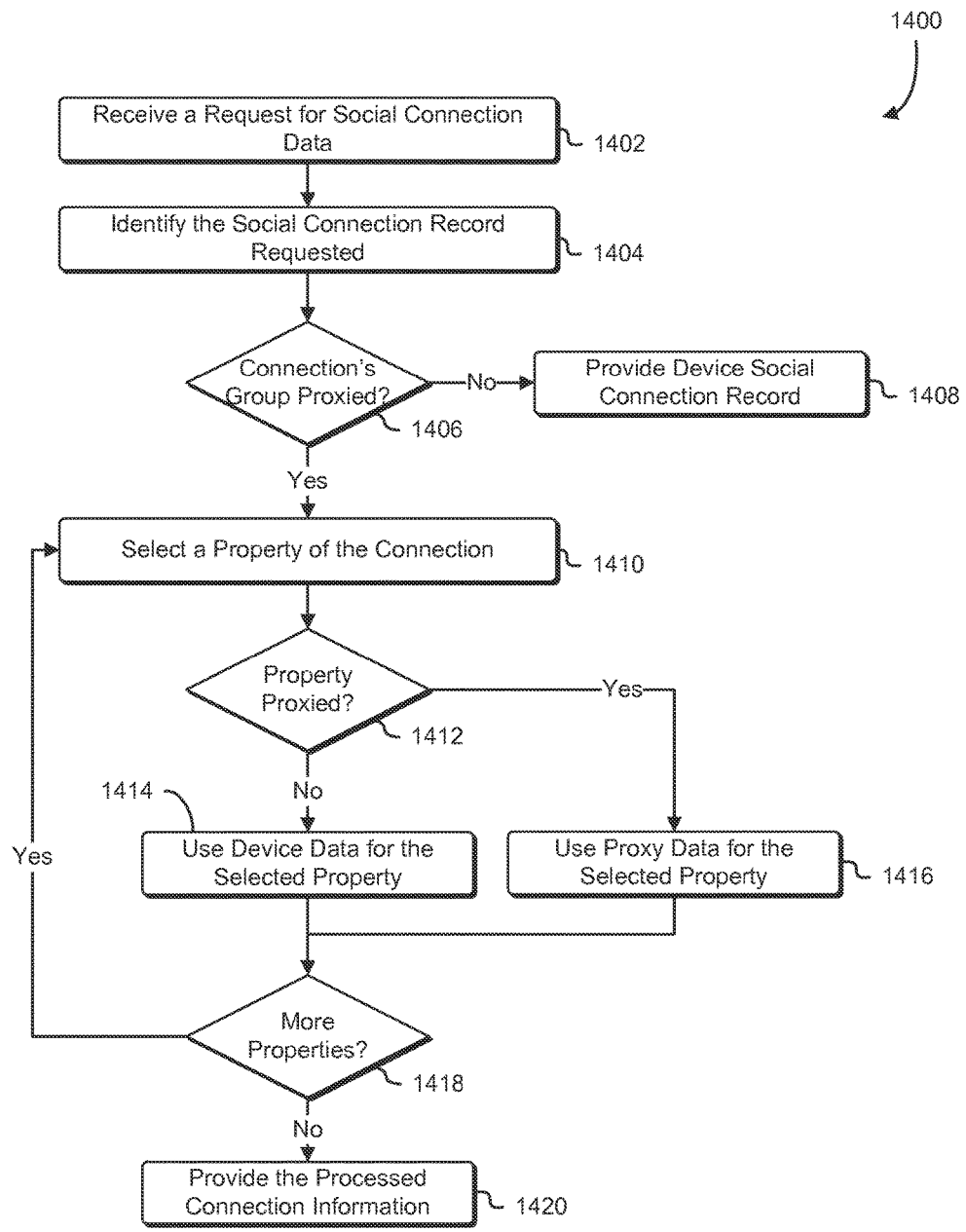
FIG. 14 shows an illustrative example of a process that, when performed by a social-data proxy module, processes a request for social connection data in accordance with an embodiment.

FIG. 14 shows an illustrative example of a process that, when performed by a social-data proxy module, processes a request for social-connection data in accordance with an embodiment. A process diagram 1400 illustrates a process performed by a social-data proxy module. The process begins at block 1402 where the social-data proxy module receives a request from an application for social-connection data. At block 1404, the social-data proxy module identifies the particular device social-connection data record requested by the application. The social-data proxy module interrogates the particular device social-connection data record and determines a connection group to which the particular device social-connection data record belongs. At block 1406, the social-data proxy module determines whether the user has configured the social-data proxy module to proxy social-data records that belong to the connection group. When the connection group to which the particular device social-connection data record belongs is not a connection group that has been selected by the user for proxy, the social-data proxy module fulfills the request by providing 1408 the device social-connection data record to the application.

At block 1410, the social-data proxy module begins a process of merging the particular device social-connection data record with a corresponding proxy social-connection data record. The merging process is based at least in part on configuration information associated with the social-data proxy module such as the information illustrated in FIG. 12. When the connection group to which the particular device social-connection data record belongs is a connection group that has been selected by the user for proxy, the social-data proxy module selects 1410 a property of the device social-connection data record. Based at least in part on configuration information associated with the social-data proxy module, the social-data proxy module determines 1412 whether the selected property of the device social-connection data record is a property selected by the user for proxy. When the selected property of the device social-connection data record is not a property selected by the user for proxy, the social-data proxy module uses 1414 device social-connection data for the selected property. When the selected property of the device social-connection data record is a property selected by the user for proxy, the social-data proxy module uses 1416 proxy social-connection data for the selected property. At block 1418, the social-data proxy module determines whether additional properties of the device social-connection data record have not been processed. When additional properties of the device social-connection data record remain to be processed, execution returns to block 1410 where another property is selected. When the properties of the device social-connection data record have been processed, the combined social-connection data record is provided 1420 to the requesting application.

Figure 15:
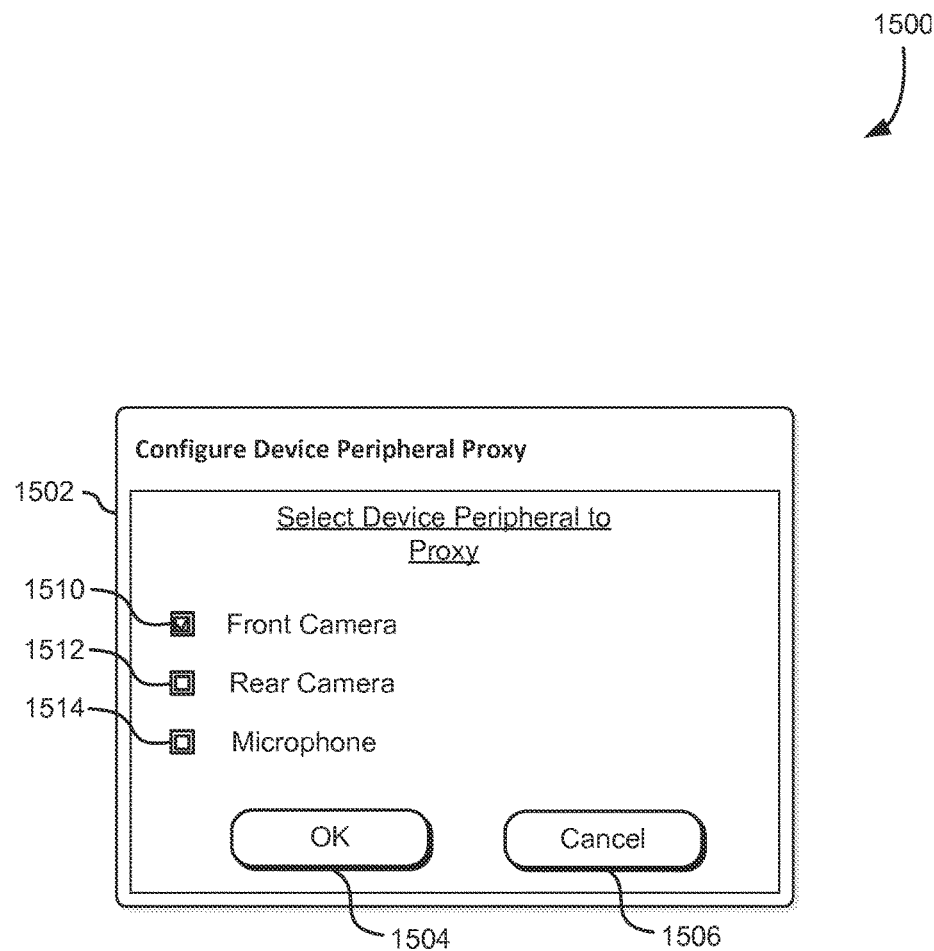
FIG. 15 shows an illustrative example of a UI for configuring a device-peripheral proxy module in accordance with an embodiment.

FIG. 15 shows an illustrative example of a UI for configuring a device-peripheral proxy module in accordance with an embodiment. A wireframe diagram 1500 shows a peripheral-proxy configuration dialog 1502 that includes an okay button 1504 and a cancel button 1506. When a user selects the okay button 1504, the peripheral-proxy configuration data that is presented in the dialog box is saved and the dialog box is closed. When the user selects the cancel button 1506, the dialog box is closed without saving the displayed peripheral-proxy configuration data.

The peripheral-proxy configuration dialog 1502 includes a front camera checkbox 1510, a rear camera checkbox 1512, and a microphone checkbox 1514. When checked, the front camera checkbox 1510 configures a device-peripheral proxy module to fulfill requests for front camera images with a front proxy image. In some implementations, the front proxy image is a black screen having a size and resolution identical to the front camera. The rear camera checkbox 1512, when checked, configures the device-peripheral proxy module to fulfill the request for rear camera images with a rear proxy image. In various implementations, the rear proxy image is a blank image having a size and resolution equal to the size and resolution of the rear camera. When the microphone checkbox 1514 is checked, the device-peripheral proxy module fulfills requests for microphone data using microphone proxy data that represents a stream of silence. In some implementations, the microphone proxy data represents a stream of white noise. In various implementations, the microphone proxy data has a sample rate and amplitude corresponding to the sample rate and amplitude of data produced by a microphone on a physical device.

In various embodiments, images created with camera, scanner, or other imaging device can be replaced with proxy images that have a lower resolution, a lower color depth, or modified viewport. For example, in one implementation, images maintained in a photo album a mobile device are replaced with proxy images that have a lower resolution. In another example, color images taken with an on-device camera are replaced with black-and-white images. In yet another example, proxy images are generated by identifying and obscuring facial characteristics of one or more persons in the image.

Figure 16:
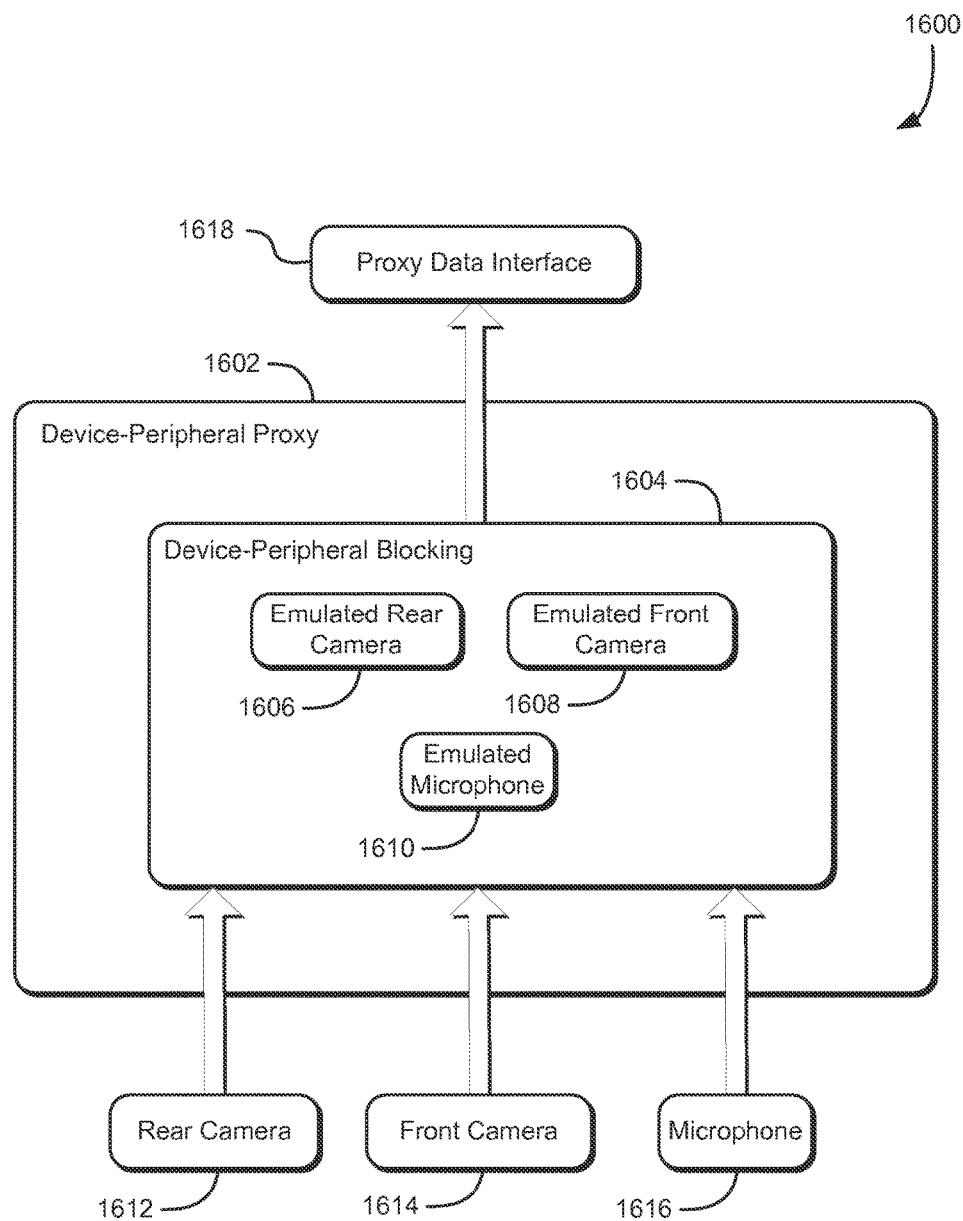
FIG. 16 shows an illustrative example of a device-peripheral proxy module in accordance with an embodiment.

FIG. 16 shows an illustrative example of a device-peripheral proxy module in accordance with an embodiment. A block diagram 1600 shows an example of a device-peripheral proxy module 1602 that includes a device-peripheral blocking module 1604. The device-peripheral blocking module 1604 includes an emulated rear camera 1606, an emulated front camera 1608 and an emulated microphone 1610. The device-peripheral proxy module 1602 provides access to data that originates from a rear camera 1612, a front camera 1614, and a microphone 1616 by way of a proxy data interface 1618.

In various embodiments, the device-peripheral blocking module 1604 includes a variety of emulated device peripherals. The emulated device peripherals are used to generate proxy data that is provided to applications in lieu of actual device peripheral data. The proxy data produced by the emulated device peripherals conforms to the format and structure of the data produced by the actual device peripherals. In some embodiments, the emulated device peripherals present an interface that simulates the interface presented by an actual device peripheral. For example, an actual device microphone can have an interface that includes a 16-bit data register and a 16-bit control register. A corresponding emulated microphone would have a similar 16-bit data register and a similar 16-bit control register. In various embodiments, the emulated device peripherals produce alternative data that does not reflect actual device data. For example, an emulated camera may produce a blank image, or an emulated microphone may produce a sound stream of silence or white noise. In some implementations, the emulated device peripherals produced data based at least in part on the actual device peripheral data, but at a reduced fidelity, a reduced resolution, or at a reduced bit rate than the device peripherals.

In certain embodiments, the device-peripheral blocking module 1604 provides either emulated peripheral data or actual peripheral data based at least in part on configuration information that has been previously entered by the user and is associated with the device-peripheral proxy module 1602.

Figure 17:
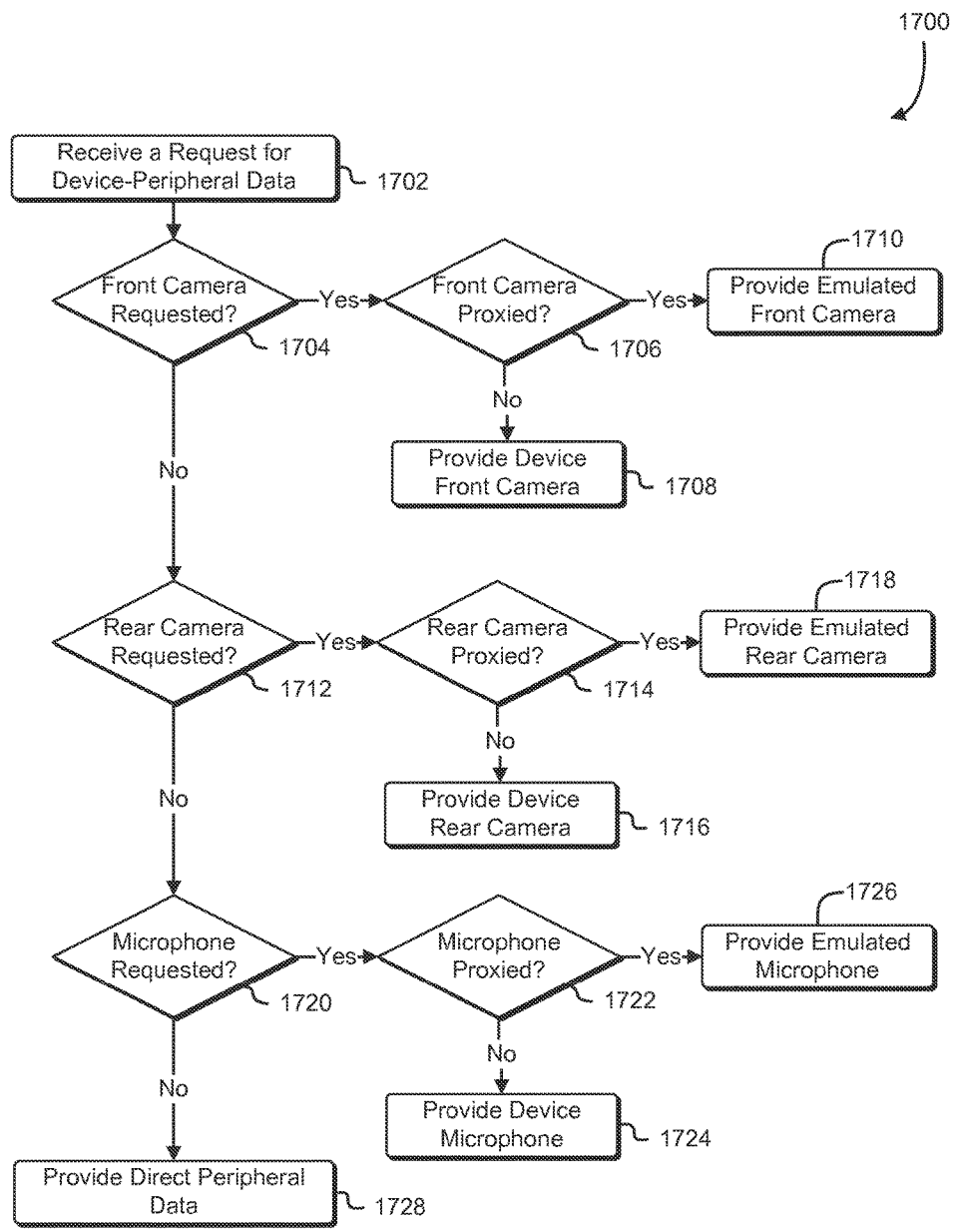
FIG. 17 shows an illustrative example of a process that, when performed by a device-peripheral proxy module, processes a request to access device-peripheral data in accordance with an embodiment.

FIG. 17 shows an illustrative example of a process that, when performed by a device-peripheral proxy module, processes a request to access device-peripheral data in accordance with an embodiment. A process 1700 begins at block 1702 when a device-peripheral proxy module receives a request for device-peripheral data. In some embodiments, the request for device-peripheral data is in the form of a request to access peripheral hardware on a device.

When the requested device-peripheral data is determined 1704 to be front camera data, execution proceeds to decision block 1706. At decision block 1706, the device-peripheral proxy module determines, based at least in part on configuration information associated with the device-peripheral proxy module, whether the user has specified that requests for front camera data are to be fulfilled using proxy data. When the user has not specified that requests for front camera data are to be fulfilled using proxy data, execution proceeds to block 1708 and the device-peripheral proxy module provides actual device front camera data. When the user has specified that requests for front camera data are to be fulfilled using proxy data, execution proceeds to block 1710 where the device-peripheral proxy module provides front camera data generated by the emulated front camera 1608.

When the requested device-peripheral data is determined 1712 to be rear camera data, execution proceeds to decision block 1714. At decision block 1714, the device-peripheral proxy module determines, based at least in part on configuration information associated with the device-peripheral proxy module, whether the user has specified that requests for rear camera data are to be fulfilled using proxy data. When the user has not specified that requests for rear camera data are to be fulfilled using proxy data, execution proceeds to block 1716 and the device-peripheral proxy module provides actual rear camera data. When the user has specified that requests for rear camera data are to be filled using proxy data, execution proceeds to block 1718 where the device-peripheral proxy module provides rear camera data generated by the emulated rear camera 1606.

When the requested device-peripheral data is determined 1720 to be microphone data, execution proceeds to decision block 1722. At decision block 1722, the device-peripheral proxy module determines, based at least in part on configuration information associated with the device-peripheral proxy module, whether the user has specified that requests for microphone data are to be fulfilled using proxy data. When the user has not specified that requests for microphone data are to be fulfilled using proxy data, execution proceeds to block 1724 where the device-peripheral proxy module provides actual microphone data. When the user has specified that requests for microphone data are to be fulfilled using proxy data, execution proceeds to block 1726 where the device-peripheral proxy module provides microphone data generated by the emulated microphone 1610.

When the requested device-peripheral data is determined to be for data generated by a device for which no emulation is available, the device-peripheral proxy module provides 1728 the actual device-peripheral data requested.

Figure 18:
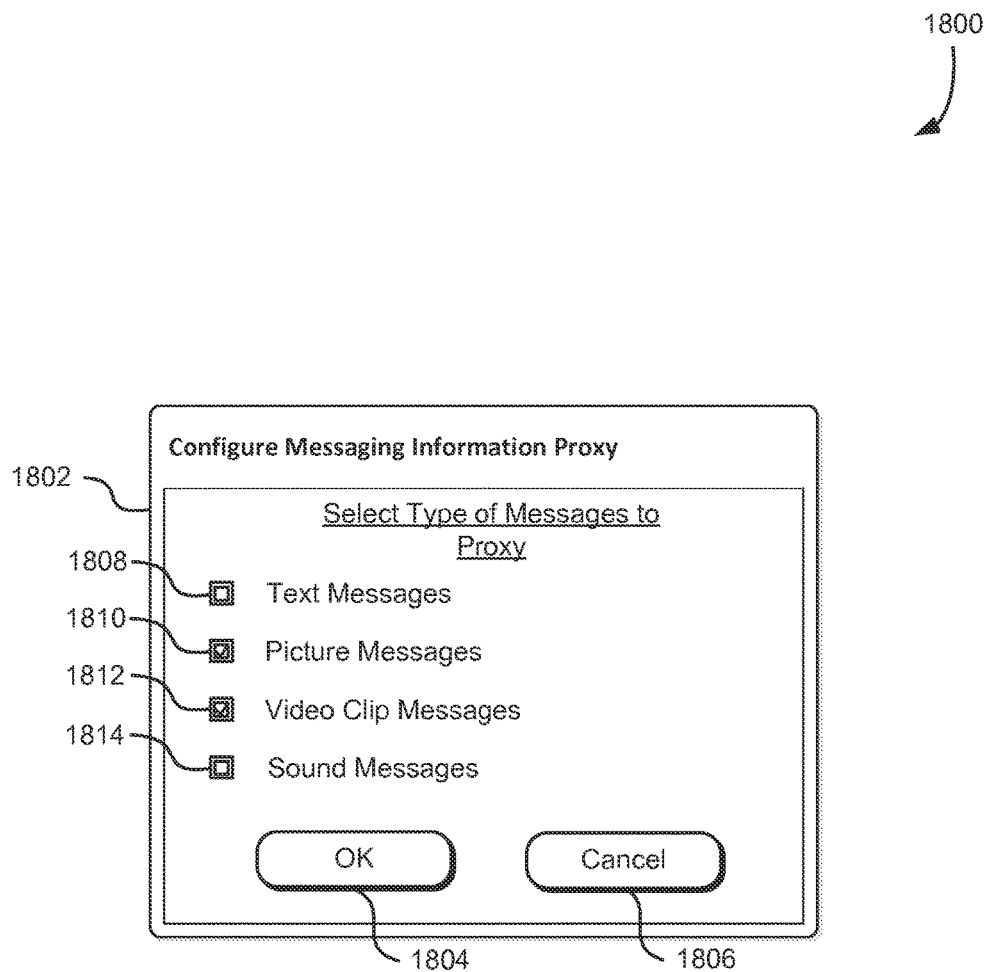
FIG. 18 shows an illustrative example of a UI for configuring a messaging-data proxy module in accordance with an embodiment.

FIG. 18 shows an illustrative example of a UI for configuring a messaging-data proxy module in accordance with an embodiment. A wireframe diagram 1800 shows an example of a messaging-information configuration dialog

1802. The messaging-information configuration dialog 1802 includes an okay button 1804 and a cancel button 1806. When a user selects the okay button 1804 a set of configuration information that is represented in the messaging-information configuration dialog 1802 is saved and the user interface is closed. When a user selects the cancel button 1806, the user interface is closed without saving the set of configuration information.

The messaging-information configuration dialog 1802 includes a text message checkbox 1808, a picture message checkbox 1810, a video clip message checkbox 1812, and a sound message checkbox 1814. Each checkbox represents a type of instant message that, when requested by an application, can be replaced with a proxy instant message. By checking a particular checkbox, the user configures a message proxy module so that when a particular message of the indicated message type is requested by an application, the request for the particular message will be fulfilled using a corresponding proxy message.

Figure 19:
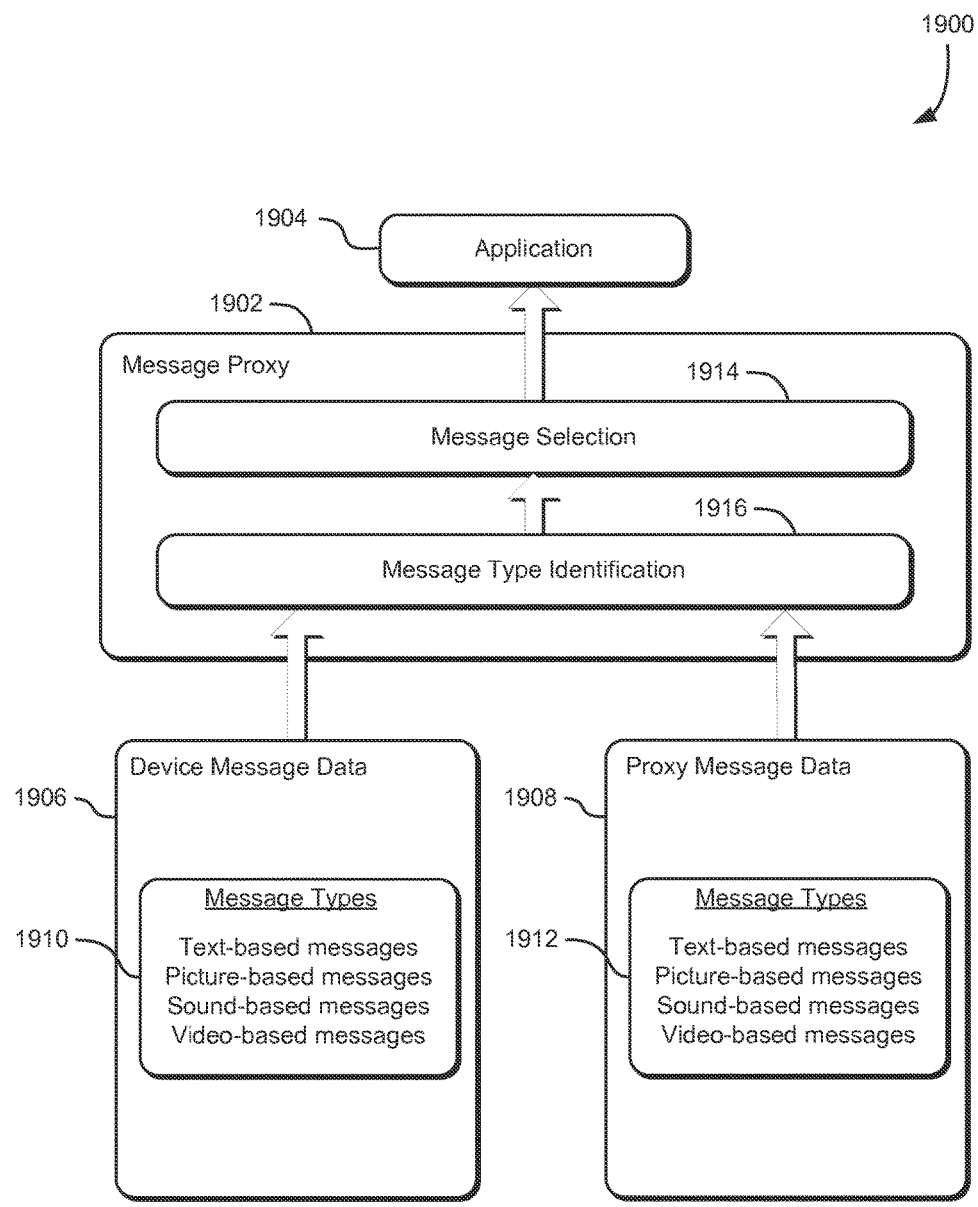
FIG. 19 shows an illustrative example of a message proxy module in accordance with an embodiment.

FIG. 19 shows an illustrative example of a message proxy module in accordance with an embodiment. A block diagram 1900 illustrates an example of a message proxy module 1902. The message proxy module 1902 provides message data to requesting applications via a proxy data interface 1904. The proxy data interface 1904 provides a common interface to the various proxy modules contained in a data proxy layer. The message proxy module 1902 has access to device message data 1906 and proxy message data 1908. The device message data 1906 includes records that belong to a number of device message types 1910. The proxy message data 1908 includes records that belong to a number of proxy message types 1912. In the implementation shown, the device message types 1910 and the proxy message types 1912 include text-based messages, picture-based messages, sound-based messages, and video-based messages. In some implementations, the proxy message types 1912 include additional groups that are not present in the device message types 1910.

The message proxy module 1902 includes a message selection module 1914 and a message type identification module 1916. When a request for message data is processed by the message proxy module 1902, the message type identification module 1916 identifies the particular message record requested, and determines a message type of the particular message record. If the message type has not been selected by the user as a message type to proxy, the message selection module 1914 satisfies the request with the device message data 1906. If the message type has been selected by the user as a message type that will be proxied, then the message selection module 1914 satisfies the request with the proxy message data 1908.

Figure 20:
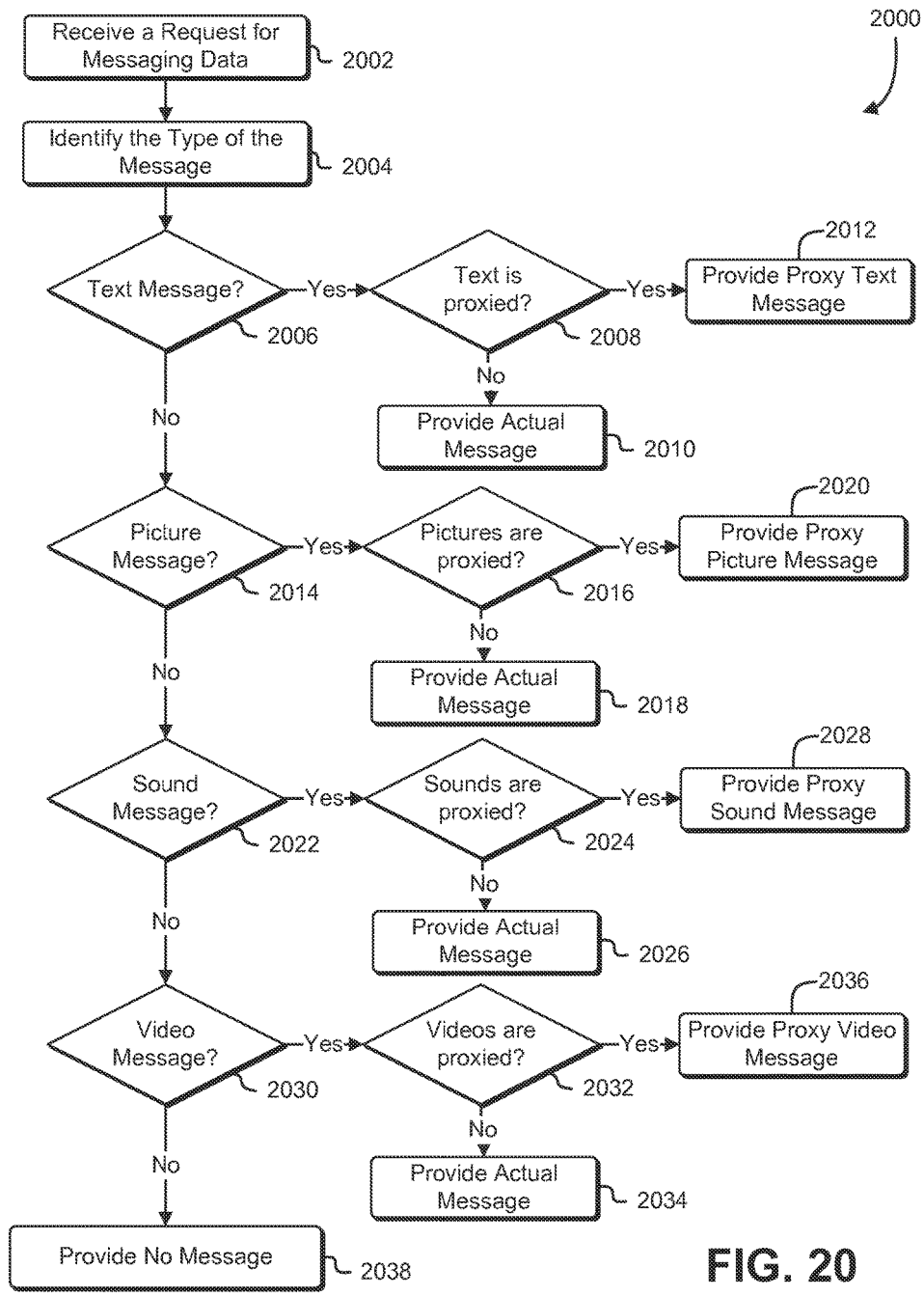
FIG. 20 shows an illustrative example of a process that, when performed by a message proxy module, processes a request to access messaging data in accordance with an embodiment.

FIG. 20 shows an illustrative example of a process that, when performed by a message proxy module, processes a request to access messaging data in accordance with an embodiment. A process diagram 2000 illustrates a process performed by a message proxy module. The process begins at block 2002 where the message proxy module receives a request from an application for messaging data. At block 2004, the message proxy module identifies the particular device message data record requested by the application. The message proxy module interrogates the particular device message data record and determines a message type of the particular device message data record.

At decision block 2006, the message proxy module determines whether the particular device message data record is a text message. When the particular device message data record is a text message, execution proceeds to decision block 2008 where the message proxy module determines whether the user has configured the message proxy module to provide proxy data for text messages. When the user has configured the message proxy module to provide device data for text messages, the particular device message data record is provided 2010 to the application to fulfill the request. When the user has configured the message proxy module to provide proxy data for text messages, a proxy text message data record is provided 2012 to the application.

At decision block 2014, the message proxy module determines whether the particular device message data record is a picture message. When the particular device message data record is a picture message, execution proceeds to decision block 2016 where the message proxy module determines whether the user has configured the message proxy module to provide proxy data for picture messages. When the user has configured the message proxy module to provide device data for picture messages, the particular device message data record is provided 2018 to the application to fulfill the request. When the user has configured the message proxy module to provide proxy data for picture messages, a proxy message data record is provided 2020 to the application.

At decision block 2022, the message proxy module determines whether the particular device message data record is a sound message. When the particular device message data record is a sound message, execution proceeds to decision block 2024 where the message proxy module determines whether the user has configured the message proxy module to provide proxy data for sound messages. When the user has configured the message proxy module to provide device data for sound messages, the particular device message data record is provided 2026 to the application to fulfill the request. When the user has configured the message proxy module to provide proxy data for sound messages, a proxy message data record is provided 2028 to the application.

At decision block 2030, the message proxy module determines whether the particular device message data record is a video message. When the particular device message data record is a video message, execution proceeds to decision block 2032 where the message proxy module determines whether the user has configured the message proxy module to provide proxy data for video messages. When the user has configured the message proxy module to provide device data for video messages, the particular device message data record is provided 2034 to the application to fulfill the request. When the user has configured the message proxy module to provide proxy data for video messages, a proxy message data record is provided 2036 to the application.

At block 2038, the message proxy module has determined that the particular device message data record is not of a type supported by the message proxy module. In the implementation shown, the message proxy module does not provide message data to the application. In some implementations, at block 2038, the message proxy module provides the particular device message data record to the application. In yet another implementation, at block 2038, the message proxy module provides a proxy text message data record to the application.

Figure 21:
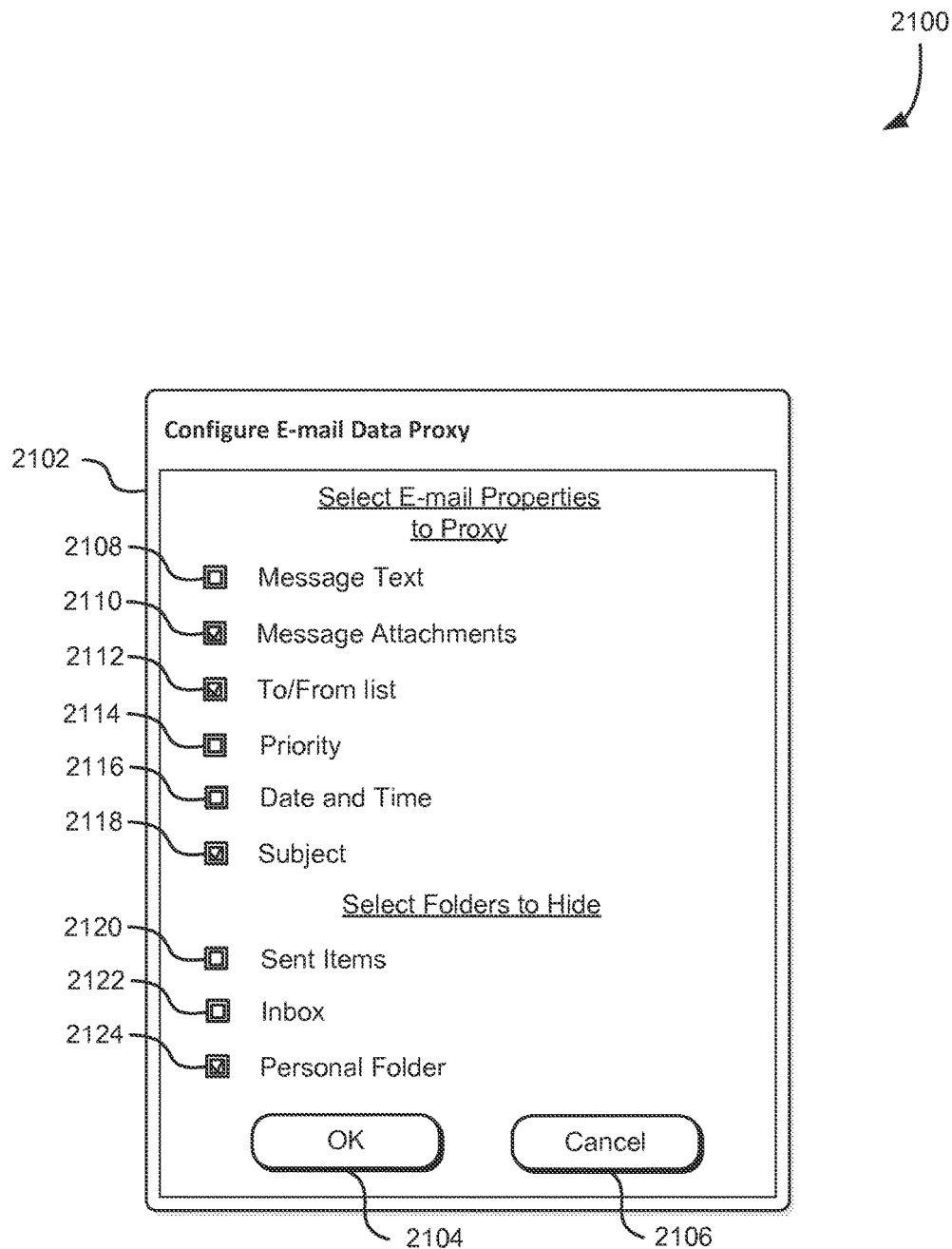
FIG. 21 shows an illustrative example of a UI for configuring an email proxy module in accordance with an embodiment.

FIG. 21 shows an illustrative example of a UI for configuring an email proxy module in accordance with an embodiment. A wireframe diagram 2100 shows an email-proxy configuration dialog 2102. The email-proxy configuration dialog 2102 includes an okay button 2104 and a cancel button 2106. When the okay button 2104 is selected by a user, configuration information that is displayed in the email-proxy configuration dialog 2102 is saved and the dialog box is closed. When the cancel button 2106 is selected by a user, the dialog box is closed without saving the displayed email-proxy configuration information. The configuration information displayed and saved using the email-proxy configuration dialog 2102 is associated with an email-proxy module.

The email-proxy configuration dialog 2102 includes two groups of checkboxes. A first group of checkboxes represents particular properties of email data records where proxy data will be used. The first group of checkboxes includes a message text checkbox 2108, a message attachments checkbox 2110, a to/from list checkbox 2112, a priority checkbox 2114, a date and time checkbox 2116, and a subject checkbox 2118. By checking a particular checkbox in the first group of checkboxes, a user configures an email proxy module to replace a particular property of an email message with proxy data. For example, by checking the to/from list checkbox 2112, an application requesting a particular email message will receive an email message where the to/from list property of the email message has a proxy data value. A second group of checkboxes represents email folders that contain email messages that will not be provided to a requesting application. The second group of checkboxes includes a sent items checkbox 2120, an inbox checkbox 2122, and a personal folder checkbox 2124. For example, by checking the sent items checkbox 2120, email messages from the sent items folder will not be provided to the requesting application.

Figure 22:
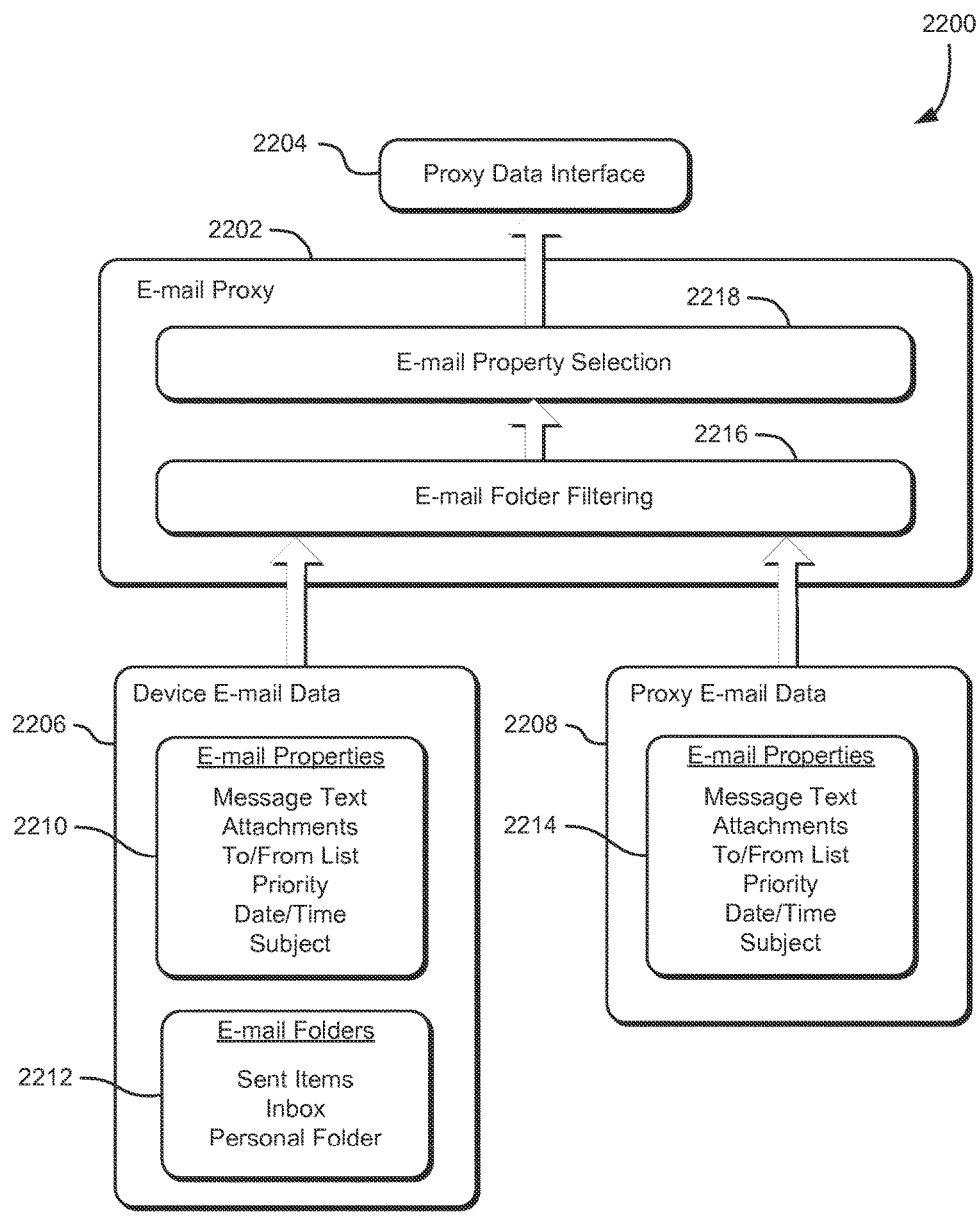
FIG. 22 shows an illustrative example of an email proxy module in accordance with an embodiment.

FIG. 22 shows an illustrative example of an email proxy module in accordance with an embodiment. A block diagram 2200 shows an example of an email proxy module 2202. The email proxy module 2202 provides email data to requesting applications via a proxy data interface 2204. The proxy data interface 2204 provides a common interface to the various proxy modules contained in a data proxy layer. The email proxy module 2202 has access to device email data 2206 and proxy email data 2208. The device email data 2206 includes email messages, each message having a number of email properties 2210, and each message belonging to one of a number of email folders 2212. The proxy email data 2208 includes email messages, each message having a number of proxy email properties 2214.

The email proxy module 2202 includes an email folder filtering module 2216 and an email property selection module 2218. When the application requests a particular device email message, the email folder filtering module 2216 identifies a folder to which the particular device email message belongs. When the particular device email message belongs to a folder which the user has specified as a folder that will be hidden, the email proxy module 2202 does not provide the particular device email message to the application. In various implementations, the email folder filtering module 2216 determines whether a folder is hidden based at least in part on stored configuration information associated with the email proxy module 2202. When the particular device email message does not belong to a hidden folder, the email property selection module 2218 determines, based at least in part on stored configuration information associated with the email proxy module 2202, which properties of the particular email message to replace with proxy data before returning the email message to the application via the proxy data interface 2204.

For example, in some implementations, an application requests a particular email message having a message text of "hello," and a subject of "message from Ted." The particular email is in the user's inbox. Referring to the configuration UI of FIG. 21, if the user unchecks the inbox checkbox 2122, unchecks the message text checkbox 2108 and checks the subject checkbox 2118, then in response to the request the application will receive an email message having a message text of "hello", and a subject containing proxy data such as "message from Alex."

In various implementations, particular device data can be programmatically altered to create corresponding proxy data. For example, proxy data can be generated using various natural language processing ("NLP") techniques to create text fragments that resemble the corresponding device data in form, but not in content. In another example, proxy images can be created by analyzing the context of a device image using image metadata and selecting a stock image from an online library of stock images.

Figure 23:
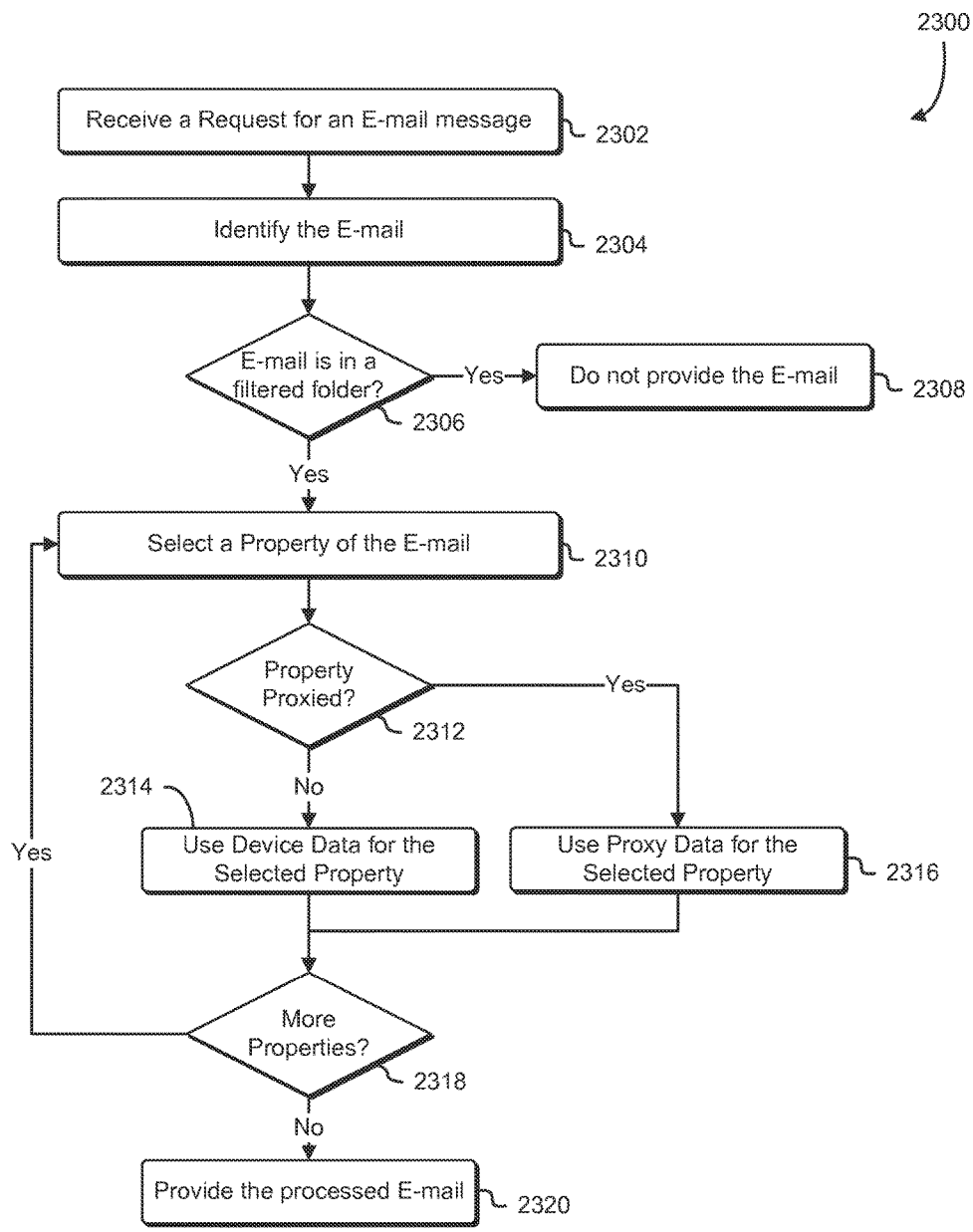
FIG. 23 shows an illustrative example of a process that, when performed by an email proxy module, processes a request to access an email message in accordance with an embodiment.

FIG. 23 shows an illustrative example of a process that, when performed by an email proxy module, processes a request to access an email message in accordance with an embodiment. A process diagram 2300 illustrates a process performed by an email proxy module. The process begins at block 2302 where the email proxy module receives a request from an application for an email message. At block 2304, the email proxy module identifies the particular email message requested and determines a folder to which the particular email message belongs. The email proxy module determines 2306, based at least in part on configuration information associated with the email proxy module, whether the particular email message belongs to a hidden folder. When the particular email belongs to a hidden folder, execution proceeds to block 2308, and the email proxy module does not provide the particular email message to the application.

When the particular email message does not belong to hidden folder, execution proceeds to block 2310 where the email proxy module begins iterating through the properties of the particular email message. At block 2310, the email proxy module selects a particular property of the particular email message. The email proxy module determines 2312, based at least in part on configuration information associated with the email proxy module, whether the particular property of the particular email message is proxied. When the particular property of the particular email message is not proxied, the email proxy module uses device data for the selected property at block 2314. When the particular property of the particular email message is proxied, the email proxy module uses proxy data for the selected property at block 2316. At decision block 2318, the email proxy module determines if there are more properties of the particular email message to be processed. When there are more properties of the particular email message to be processed, execution returns to block 2310 and another property of the particular email is selected. When there are no more properties of the particular email message to be processed, execution proceeds to block 2320 and the processed email message is provided to the requesting application.

Figure 24:
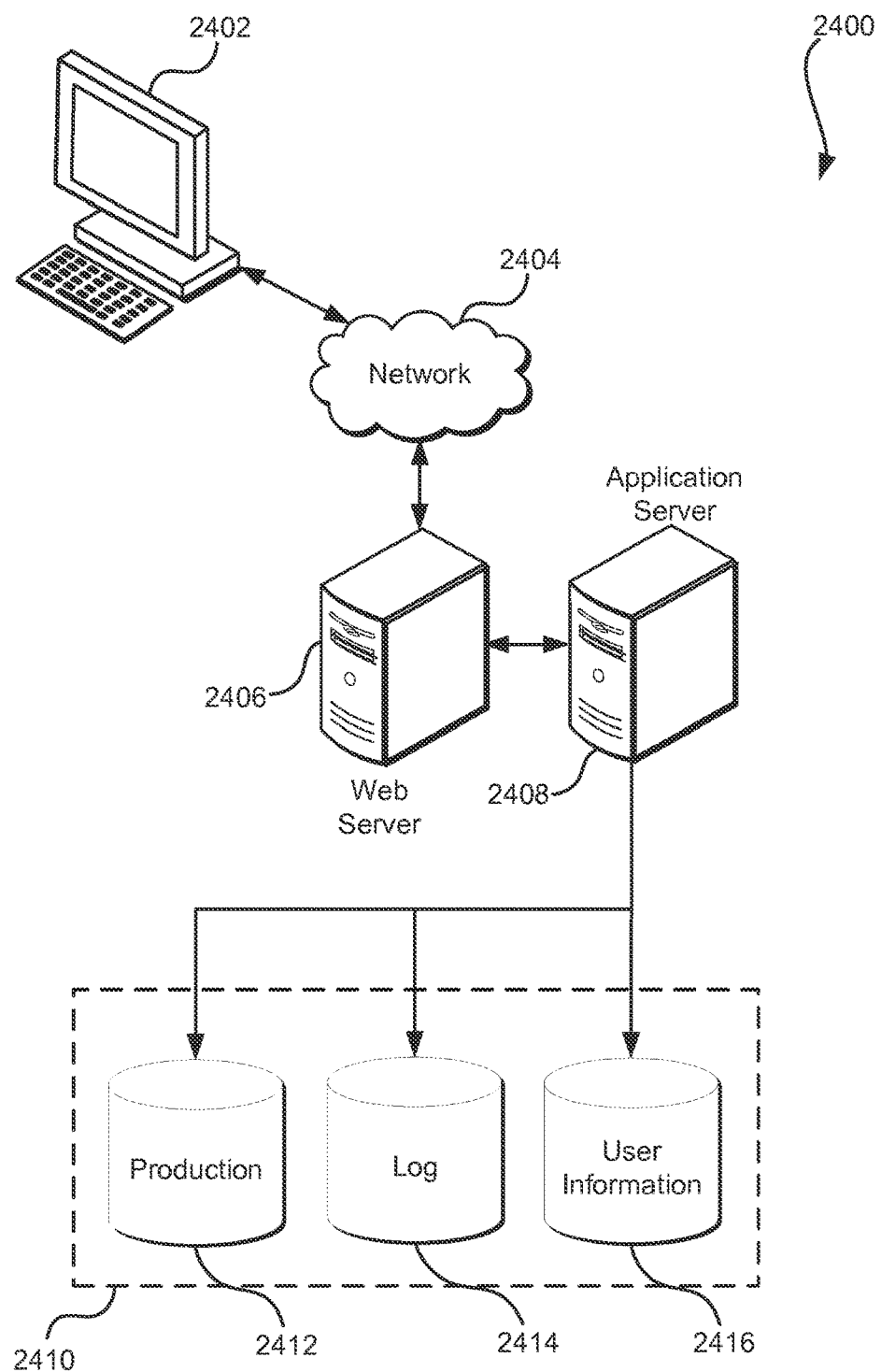
FIG. 24 illustrates an environment in which various embodiments can be implemented.

FIG. 24 illustrates aspects of an example environment 2400 for implementing aspects in accordance with various embodiments. As will be appreciated, although a web-based environment is used for purposes of explanation, different environments may be used, as appropriate, to implement various embodiments. The environment includes an electronic client device 2402, which can include any appropriate device operable to send and/or receive requests, messages, or information over an appropriate network 2404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 2406 for receiving requests and serving content in response thereto, although for other networks an alternative device serving a similar purpose could be used as would be apparent to one of ordinary skill in the art.

The illustrative environment includes at least one application server 2408 and a data store 2410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 2402 and the application server 2408, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 2410 can include several separate data tables, databases, data documents, dynamic data storage schemes and/or other data storage mechanisms and media for storing data relating to a particular aspect of the present disclosure. For example, the data store illustrated may include mechanisms for storing production data 2412 and user information 2416, which can be used to serve content for the production side. The data store also is shown to include a mechanism for storing log data 2414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 2410. The data store 2410 is operable, through logic associated therewith, to receive instructions from the application server 2408 and obtain, update or otherwise process data in response thereto. The application server 2408 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 2402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 24. Thus, the depiction of the system in FIG. 24 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of a computing device configured with executable instructions,
receiving, at the computing device, a request for device data from an application executed by the computing device;
displaying, on a display device associated with the computing device, a user interface that provides alternatives of granting the request, denying the request, or fulfilling the request with proxy data;
receiving, via the user interface, a selection of fulfilling the request with proxy data;
generating proxy data that has a different value than the requested device data, and that is structured in a manner that is compatible, as a replacement for the requested device data, with the application; and
providing the proxy data to the application in response to the request for device data.

2. The computer-implemented method of claim 1, wherein:
the method further comprises displaying a proxy-configuration user interface that is configured to specify a set of data fields associated with device contact records;
the requested device data is a contact record; and
the proxy data is created by duplicating the requested contact record, and altering one or more values of the proxy data that are associated with the specified set of data fields.

3. The computer-implemented method of claim 1, wherein:
the method further comprises displaying a proxy-configuration user interface that is configured to specify a set of social-connection groups and a set of social-connection properties;
the requested device data is a social connection that belongs to a particular social-connection group within the specified set of social-connection groups; and
as a result of the social connection belonging to the particular social-connection group within the specified set of social-connection groups, one or more values of the proxy data that are associated with the specified set of social-connection properties have different values than corresponding properties of the requested social connection.

4. The computer-implemented method of claim 1, wherein:
the method further comprises displaying a proxy-configuration user interface that is configured to specify a set of instant-message types;
the requested device data is an instant message having a particular instant-message type;
as a result of the particular instant-message type being in the specified set of instant-message types, the proxy data is an instant message of the particular instant-message type; and as a result of the particular instant-message type not being in the specified set of instant-message types, the requested data is provided to the application.

5. A system, comprising one or more processors and memory storing instructions that, when executed by the one or more processors cause the system to:
receive a request for device data from an application installed on the system;
obtain proxy data that is compatible with the application, the proxy data having one or more values different from corresponding one or more values of the requested device data; and
provide the proxy data to the application in response to the request for device data.

6. The system of claim 5, wherein:
the requested device data is a contact record having a plurality of contact-record fields, the contact-record fields including a first name, a last name, a title, a home phone, a work phone, a cell phone, an email address, and a mailing address;
the proxy data is a data record having the plurality of contact-record fields; and
the one or more values of the proxy data that are associated with the plurality of contact-record fields are determined based at least in part on configuration information.

7. The system of claim 5, wherein:
the requested device data is an instant message of a particular instant-message type; and
the proxy data is an instant message of the particular instant-message type.

8. The system of claim 5, wherein:
the requested device data is a geolocation; and
the proxy data is created by adding an offset to the geolocation.

9. The system of claim 5, wherein:
the requested device data is data from a device peripheral; and
the proxy data is provided using an emulated device peripheral interface.

10. The system of claim 5, wherein the system obtains the proxy data by creating the proxy data as a result of receiving the request.

11. The system of claim 5, wherein:
the requested device data is an email message having a plurality of email properties, the email properties including a message text, a message attachments, a recipient list, a priority, a date, and a subject;
the proxy data is a data record having one or more values for individual properties of the plurality of email properties; and
the one or more values of the proxy data are determined based at least in part on configuration information.

12. The system of claim 5, wherein the instructions, when executed by the one or more processors, cause the system to:
determine that the application is transmitting a particular device data to a remote server; and
as a result of determining that the application is transmitting the particular device data to a remote server, generate a particular proxy data to replace the particular device data, and provide the particular proxy data to the application.

13. A non-transitory computer-readable storage medium having stored thereon executable instructions that, when executed by one or more processors of a computing device, cause the computing device to at least:
receive a request for data stored on the computing device from an application running on the computing device;
display a user interface on the computing device to enable entry of user input of configuration information;
store the configuration information entered via the user interface;
generate a proxy data based at least in part on the stored configuration information; and
provide the proxy data to the application.

14. The non-transitory computer-readable medium of claim 13, wherein the proxy data is generated using a reversible transformation that allows device data values to be derived from proxy data values.

15. The non-transitory computer-readable medium of claim 13, wherein:
the requested data is an instant message, the instant message being a type of instant message that is a text message type, a picture message type, or a video message type; and
the application is provided with either the requested data or the proxy data based at least in part on the type of instant message.

16. The non-transitory computer-readable medium of claim 13, wherein:
the requested data is a geolocation; and
the proxy data is created by retrieving a historical geolocation that was recorded an amount of time in the past.

17. The non-transitory computer-readable medium of claim 13, wherein:
the requested data is data from a microphone or camera; and
the proxy data is created using an emulated microphone or an emulated camera.

18. The non-transitory computer-readable medium of claim 13, wherein:
the requested data is a social connection belonging to a family group, an extended family group, or a friends group; and
the proxy data is a social-connection record having one or more values that are determined based at least in part on the configuration information, and a group membership of the requested data.

19. The non-transitory computer-readable medium of claim 13, wherein:
the requested data is an email message is located in a particular email folder; and
whether proxy data or the requested data is provided to the application is determined based at least in part on the particular email folder.

20. The non-transitory computer-readable medium of claim 13, wherein the executable instructions, when executed by one or more processors of the computing device, cause the computing device to at least:
determine whether device data is transmitted by the application to a remote server;
as a result of determining that the application transmits the device data to the remote server, providing proxy data to the application; and
as a result of determining that the application is not transmitting the device data to the remote server, providing additional device data to the application.

* * * * *